United States Patent
Fuchs et al.

(10) Patent No.: US 11,615,264 B2
(45) Date of Patent: Mar. 28, 2023

(54) SYSTEMS AND METHODS FOR IMAGE CLASSIFICATION USING VISUAL DICTIONARIES

(71) Applicant: MEMORIAL SLOAN KETTERING CANCER CENTER, New York, NY (US)

(72) Inventors: Thomas J. Fuchs, New York, NY (US); Hassan Muhammad, New York, NY (US)

(73) Assignee: Memorial Sloan Kettering Cancer Center, New York, NY (US)

( * ) Notice: Subject to any disclaimer, the term of this patent is extended or adjusted under 35 U.S.C. 154(b) by 32 days.

(21) Appl. No.: 16/810,513

(22) Filed: Mar. 5, 2020

(65) Prior Publication Data

US 2020/0285890 A1    Sep. 10, 2020

Related U.S. Application Data

(60) Provisional application No. 62/814,230, filed on Mar. 5, 2019.

(51) Int. Cl.
| | |
|---|---|
| *G06T 7/00* | (2017.01) |
| *G06K 9/62* | (2022.01) |
| *G06V 10/25* | (2022.01) |

(52) U.S. Cl.
CPC .......... *G06K 9/6218* (2013.01); *G06K 9/628* (2013.01); *G06K 9/6256* (2013.01); *G06V 10/25* (2022.01)

(58) Field of Classification Search
None
See application file for complete search history.

(56) References Cited

U.S. PATENT DOCUMENTS

| | | |
|---|---|---|
| 9,990,687 B1 | 6/2018 | Kaufhold et al. |
| 2016/0005183 A1 | 1/2016 | Thiagarajan et al. |
| 2016/0063724 A1 | 3/2016 | Tunstall et al. |
| 2016/0275374 A1 | 9/2016 | Zhu et al. |
| 2016/0358024 A1 | 12/2016 | Krishnakumar et al. |
| 2018/0018451 A1 | 1/2018 | Spizhevoy et al. |

(Continued)

OTHER PUBLICATIONS

Mao, Keming, et al. "Feature representation using deep autoencoder for lung nodule image classification." Complexity 2018 (2018). (Year: 2018).*

(Continued)

*Primary Examiner* — Sean M Conner
(74) *Attorney, Agent, or Firm* — Foley & Lardner LLP

(57) ABSTRACT

Presented herein are systems and methods of clustering images using encoder-decoder models. A computing system may identify tiles derived from an image. Each tile may have a first dimension. The computing system may apply an image reconstruction model to the tiles. The image reconstruction model may include an encoder block having a first set of weights to generate embedding representations corresponding to the tiles. Each embedding representation may have a second dimension lower than the first dimension. The image reconstruction model may include a decoder block having a second set of weights to generate reconstructed tiles corresponding to the embedding representations. The computing system may apply a clustering model comprising a feature space to the embedding representations to classify each tile to one of a plurality of conditions.

17 Claims, 16 Drawing Sheets

(56) References Cited

U.S. PATENT DOCUMENTS

| | | |
|---|---|---|
| 2018/0211143 A1 | 7/2018 | Haruta |
| 2018/0240233 A1 | 8/2018 | Kiraly et al. |
| 2018/0267996 A1 | 9/2018 | Lin et al. |
| 2018/0374210 A1 | 12/2018 | Barker et al. |
| 2020/0272864 A1* | 8/2020 | Faust ................... G06V 10/764 |

OTHER PUBLICATIONS

Xu, Jun, et al. "Stacked sparse autoencoder (SSAE) for nuclei detection on breast cancer histopathology images." IEEE transactions on medical imaging 35.1 (2015): 119-130. (Year: 2015).*

Muhammad, Hassan, et al. "Unsupervised subtyping of cholangiocarcinoma using a deep clustering convolutional autoencoder." International Conference on Medical Image Computing and Computer-Assisted Intervention. Springer, Cham, 2019. (Year: 2019).*

DiFranco, Matthew D., et al. "Ensemble based system for whole-slide prostate cancer probability mapping using color texture features." Computerized medical imaging and graphics 35.7-8 (2011): 629-645. (Year: 2011).*

Aishima et al., "Proposal of progression model for intrahepatic cholangiocarcinoma: clinicopathologic differences between hilar type and peripheral type", The American Journal of Surgical Pathology, 31(7):1059-1067, 2007.

Balkwill et al., "The tumor microenvironment at a glance", (2012).

Bedard et al., "Tumour heterogeneity in the clinic", Nature, 501(7467):355, 2013.

Bejnordi et al., "Using deep convolutional neural networks to identify and classify tumor-associated stroma in diagnostic breast biopsies", Modern Pathology, 31(10):1502, 2018.

Bloom et al, "Histological grading and prognosis in breast cancer: a study of 1409 cases of which 359 have been followed for 15 years", British Journal of Cancer, 11(3):359, 1957.

Brivio et al., "Tumor reactive stroma in cholangiocarcinoma: The fuel behind cancer aggressiveness", World Journal of Hepatology, 9(9):455, 2017.

Calinski et al., "A dendrite method for cluster analysis", Commun. Stat. Theory Methods 3(1), 1-27 (1974).

Campanella et al., "Terabyte-scale deep multiple instance learning for classification and localization in pathology", arXiv preprint arXiv:1805.06983, 2018.

Campanella et al., Towards machine learned quality control: A benchmark for sharpness quantification in digital pathology. Computerized Medical Imaging and Graphics, 65:142-151, 2018.

Delahunt et al., "Gleason grading: past, present and future", Histopathology, 60(1):75-86, 2012.

Dercksen et al., "Dealing with label scarcity in computational pathology: a use case in prostate cancer classification", arXiv preprint arXiv:1905.06820 (2019).

Egeblad et al., "Tumors as organs: complex tissues that interface with theentire organism", Developmental Cell, 18(6):884-901, 2010.

Fouad et al., "Unsupervised morphological segmentation of tissue compartments in histopathological images", PLoS ONE 12(11), e0188717 (2017).

Fuchs et al., "Computational pathology: Challenges and promises for tissue analysis", Computerized Medical Imaging and Graphics, 35(7-8):515-530, 2011.

Hayashi et al., "Distinct clinicopathologic and genetic features of 2 histologic subtypes of intrahepatic cholangiocarcinoma", The American Journal of Surgical Pathology, 40(8):1021-1030, 2016.

He et al., "Deep residual learning for image recognition", In Proceedings of the IEEE Conference on Computer Vision and Pattern Recognition, pp. 770-778, (2016).

International Search Report and Written Opinion, PCT/US20/021210, Memorial Sloan Kettering Cancer Center (dated Jun. 9, 2020).

Joyce et al., "Microenvironmental regulation of metastasis", Nature Reviews Cancer, 9(4):239, 2009.

Kather et al., "Predicting survival from colorectal cancerhistology slides using deep learning: A retrospective multicenter study", PLoS Medicine, 16(1):e1002730, (2019).

Lange et al. "Deep Auto-Encoder Neural Networks in Reinforcement Learning" (published online} The 2010 International Joint Conference on Neural Networks (IJCNN). IEEE, 2010. [Retrieved on May 13, 2020) Retrieved from< URL: http://m1.informatik.uni-freiburg.de/former/_media/publications/langeijcnn2010.pdf> p. 1, col. 2; p. 2, col. 2; p. 5, col. 1; p. 6, col. 1; Fig. 7.

McKenney et al., "Histologic grading of prostatic adenocarcinoma can be further optimized", The American Journal of Surgical Pathology, 40(11):1439-1456, 2016.

Minnen, et al. "Spatially adaptive image compression using a tiled deep network." [published online] 2017 IEEE International Conference on Image Processing (ICIP). IEEE, 2017. [Retrieved on May 13, 2020] Retrieved from< URL: https://arxiv.org/pdf/1802.02629.pdf> entire document.

Moriya et al., "Unsupervised pathology image segmentation using representation learning with spherical k-mean", arXiv preprint arXiv:1804.03828 (2018).

Nakajima et al., "A histopathologic study of 102 cases of intrahepatic cholangiocarcinoma: histologic classification and modes of spreading", Hum. Pathol. 19(10), 1228-1234 (1988).

Quail et al., "Microenvironmental regulation of tumor progression and metastasis", Nature Medicine, 19(11):1423, 2013.

Russakovsky et al., "ImageNet Large Scale Visual Recognition Challenge", International Journal of Computer Vision (IJCV), 115(3):211-252, 2015.

Saha et al., "Forty-year trends in cholangiocarcinoma incidence in the us: intrahepatic disease on the rise", The Oncologist, 21(5):594-599, 2016.

Sempoux et al., "Intrahepatic cholangiocarcinoma: new insights in pathology", In Seminars in Liver Disease, vol. 31, pp. 049-060.c Thieme Medical Publishers, 2011.

Sigel et al., "Intrahepatic cholangiocarcinomas have histologically and immunophenotypically distinct small and large duct patterns", The American Journal of Surgical Pathology, 42(10):1334-1345, 2018.

Sirica et al., "Desmoplastic stroma and cholangiocarcinoma: clinical implications and therapeutic targeting", Hepatology, 59(6):2397-2402, 2014.

Song et al., "Auto-encoder based data clustering", In: Ruiz-Shulcloper, J., Sanniti di Baja, G. (eds.) CIARP 2013. LNCS, vol. 8258, pp. 117-124. Springer, Heidelberg (2013). https://doi.org/10.1007/978-3-642-41822-8-15.

Terada et al., "Expression of tenascin, type iv collagen and laminin during human intrahepatic bileduct development and in intrahepatic cholangiocarcinoma", Histopathology, 25(2):143-150, 1994.

Wen, et al. "Deep residual network predicts cortical representation and organization of visual features for rapid categorization." [published online] Scientific reports 8.1 (2018): 1-17. [Retrieved on May 12, 2020] Retrieved from< URL: https://www.nature.com/articles/s41598-018-22160-9?dlv-emuid=&dlv-mlid=O > entire document.

* cited by examiner

SYSTEMS AND METHODS FOR IMAGE CLASSIFICATION USING VISUAL DICTIONARIES

CROSS-REFERENCE TO RELATED PATENT APPLICATIONS

The present application claims priority under 35 U.S.C. § 119(e) to U.S. Provisional Application No. 62/814,230, titled "SYSTEMS AND METHODS FOR IMAGE CLASSIFICATION USING VISUAL DICTIONARIES," filed Mar. 5, 2019, which is incorporated herein by reference in its entirety.

BACKGROUND

A feature space representation may be derived for an image. A model or an algorithm executing on a computing device may be used to identify which classification the representation belongs to.

SUMMARY

At least one aspect of the present disclosure is directed to systems and methods of training encoder-decoder models to cluster images. A computing system having one or more processors coupled with memory may identify a plurality of tiles derived from a sample image of a training dataset. Each of the plurality of tiles may correspond to one of a plurality of conditions and have a first dimension. The computing system may apply an image reconstruction model to the plurality of tiles. The image reconstruction model may have an encoder block having a first set of weights to generate a plurality of embedding representations corresponding to the plurality of tiles. Each of the plurality of embedding representations may have a second dimension lower than the first dimension. The image reconstruction model may have a decoder block having a second set of weights to generate a plurality of reconstructed tiles corresponding to the plurality of embedding representations. Each of the plurality of reconstructed tiles may have a third dimension higher than the second dimension. The computing system may apply a clustering model comprising a feature space to the plurality of embedding representations to classify each the corresponding plurality of tiles to one of the plurality of conditions. The computing system may modify the feature space of the clustering model based on classifying of the plurality of embedding representations to one of the plurality of conditions. The computing system may determine as first error metric between the plurality of tiles and the corresponding plurality of reconstructed tiles. The computing system may determine a second error metric based on classifying of the plurality of embedding representations to one of the plurality of conditions. The computing system may update at least one weight of (i) the first set of weights of the encoder block or (ii) the second set of weights of the decoder block in accordance with the first error metric and the second error metric.

In some embodiments, the computing system may identify a plurality of centroids defined by the feature space of the clustering model prior to applying of the clustering model to the plurality of embedding representations, the plurality of centroids corresponding to the plurality of conditions. The plurality of centroids may correspond to the plurality of conditions. In some embodiments, the computing system may identify a plurality of points defined within the feature space of the clustering model for the corresponding plurality of embedding representations. In some embodiments, the computing system may determine the second error metric between the plurality of centroids and the plurality of points.

In some embodiments, the computing system may determine a combined error metric in accordance with a weighted summation of the first error metric and the second error metric. In some embodiments, the computing system may update the at least one of (i) the first set of weights of the encoder block or (ii) the second set of weights of the decoder block in accordance to the combined error metric.

In some embodiments, the computing system may determine that the clustering model is not at a convergence state based on a comparison of a movement metric for a plurality of centroids in the feature space to a threshold value. In some embodiments, the computing system may reapply the image reconstruction model to the plurality of tiles responsive to determining that clustering model is not at the convergence state.

In some embodiments, the computing system may apply, subsequent to updating the at least one weight, the image reconstruction to the plurality of tiles. The encoder block may generate a second plurality of embedding representations corresponding to the plurality of tiles. In some embodiments, the computing system may apply the clustering model to the second plurality of embedding representations to classify at least one of the plurality of tiles to a first condition of the plurality of conditions different from a second condition of the plurality of conditions as classified prior to the modifying of the feature space.

In some embodiments, the computing system may initialize the clustering model comprising the feature space to define a plurality of centroids corresponding to the plurality of conditions. Each of the plurality of centroids may be at least one of a random point or a predefined point within feature space.

In some embodiments, the computing system may identify, from the sample image, a region of interest corresponding to one of the plurality of conditions labeled by an annotation of the training dataset for the sample image. In some embodiments, the computing system may generate, using the region of interest identified from the sample image, the plurality of tiles from the sample image.

In some embodiments, the computing system may identify the plurality of tiles derived from the sample image of the training dataset. The sample image may be derived from a tissue sample via a histopathological image preparer. The sample image may include a region of interest corresponding to one of the plurality of conditions present in the tissue sample.

At least one aspect of the present disclosure is directed to systems and methods of clustering images using encoder-decoder models. A computing system having one or more processors coupled with memory may identify a plurality of tiles derived from an image acquired via an image acquisition device. Each of the plurality of tiles may have a first dimension. The computing system may apply an image reconstruction model to the plurality of tiles. The image reconstruction model may include an encoder block having a first set of weights to generate a plurality of embedding representations corresponding to the plurality of tiles. Each of the plurality of embedding representations may have a second dimension lower than the first dimension. The image reconstruction model may include a decoder block having a second set of weights to generate a plurality of reconstructed tiles corresponding to the plurality of embedding representations. The computing system may apply a clustering model comprising a feature space to the plurality of embedding representations to classify each the corresponding plurality of tiles to one of a plurality of conditions.

In some embodiments, the computing system may apply clustering model comprising the feature space. The feature space may define a plurality of centroids corresponding to the plurality of conditions to classify each of the corresponding plurality of tiles to one of the plurality of conditions. In some embodiments, the computing system may identify, from the image, a region of interest corresponding to one of the plurality of conditions. In some embodiments, the computing system may generate, using the region of interest identified from the image, the plurality of tiles from the image.

In some embodiments, the computing system may identify the plurality of tiles derived from the image. The image may be derived from a tissue sample via a histopathological image preparer. The image may include a region of interest corresponding to one of the plurality of conditions present in the tissue sample. In some embodiments, the computing system may train the image reconstruction model to modify at least one weight of (i) the first set of weights of the encoder block or (ii) the second set of weights of the decoder block in accordance with an error metric determined using the clustering algorithm.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
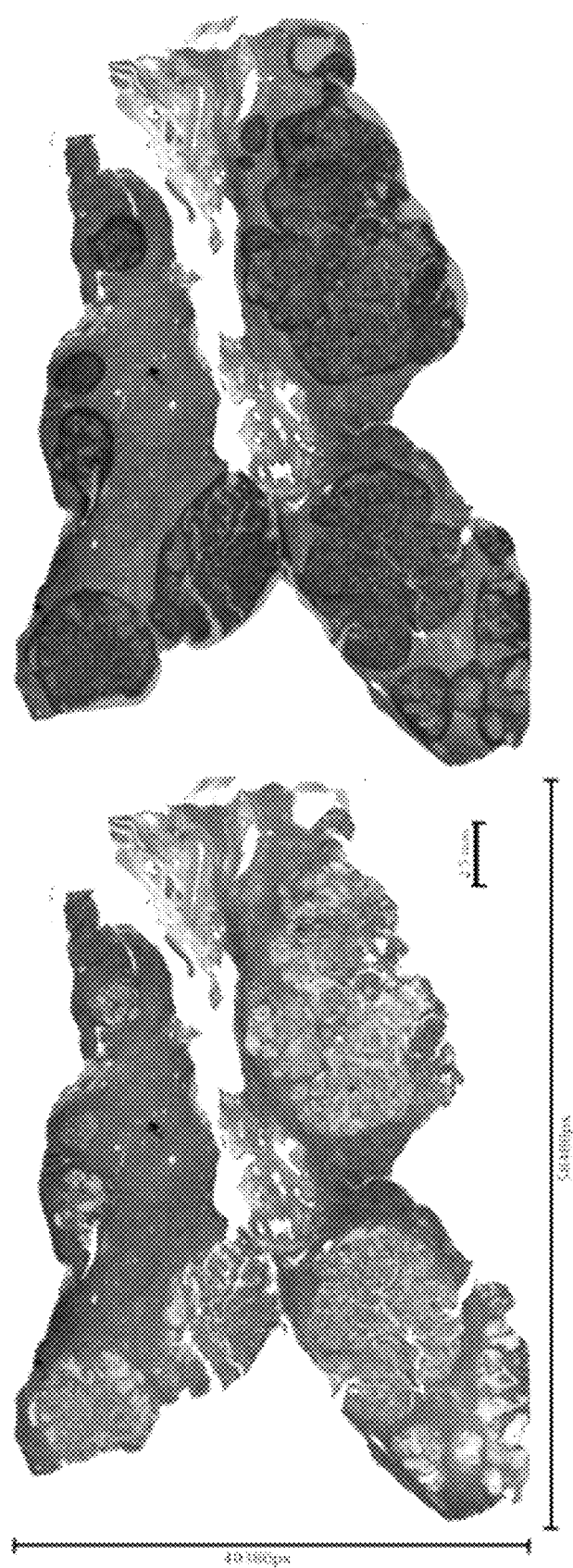
FIG. 1 depicts screenshots of whole slide images: On the left is an example of a digitized slide at low magnification. These slides are quite large, as this average example comprises at least one billion pixels of tissue. On the right, the same slide with regions of tumor annotated. Note that annotation may cover areas of background. The novel tiling protocol with quality control ensures that tiles contain high resolution and clear images of tissue.

Following below are more detailed descriptions of various concepts related to, and embodiments of, systems and methods for maintaining databases of biomedical images. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes unsupervised cancer subtyping using a histological visual dictionary.

Section B describes unsupervised subtyping of cholangiocarcinoma using a deep clustering convolutional autoencoder.

Section C describes systems and methods for clustering images using autoencoder models.

Section D describes a network environment and computing environment which may be useful for practicing various embodiments described herein.

A. Unsupervised Cancer Subtyping Using a Histological Visual Dictionary

Unlike common cancers, such as those of the prostate and breast, tumor grading in rare cancers is difficult and largely undefined because of small sample sizes and the sheer volume of time to embark on such a task. One of the most challenging examples is intrahepatic cholangiocarcinoma (ICC), for which there is well-recognized tumor heterogeneity and no grading paradigm or prognostic biomarkers.

Presented herein is a new deep convolutional autoencoder-based clustering model that, without supervision, groups together cellular and structural morphologies of tumor in 246 ICC digitized whole slides, based on visual similarity. From this visual dictionary of histologic patterns, the clusters can be used as covariates to train Cox-proportional hazard survival models. In a univariate analysis, these three clusters showed high significance for recurrence-free survival, as well as multivariate combinations of them. In a multivariate analysis of all clusters, five showed high significance to recurrence-free survival, however the overall model was not measured to be significant. Finally, a pathologist assigned clinical terminology to the prognosis-correlated clusters in the visual dictionary and found evidence supporting the hypothesis that collagen-enriched fibrosis plays a role in disease severity. These results offer insight into the future of cancer subtyping and show that computational pathology can contribute to disease prognostication, including rare cancers.

1. Introduction

Following below are more detailed descriptions of various concepts related to, and embodiments of, systems and methods for maintaining databases of biomedical images. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. Cancer grading is an important tool used to predict disease prognosis and direct therapy. Commonly occurring cancers, such as those of breast and prostate, have well established grading schemes validated on large sample sizes. The grading system for prostatic adenocarcinoma is the foremost internationally accepted grading scheme in cancer medicine. The Gleason Grading System (GGS) relates observed histologic patterns in pathology to outcome data using thousands of cases. After nearly twenty years of repeatedly designing and validating his prognostic classifications, a final review of grading prostate cancer was published. Since then, it has been a clinical standard. Although the gold standard in prostate cancer stratification, GGS is subject to ongoing critical assessment. A new dictionary of histologic patterns was created, independent from those which constituted the GGS, from a cohort of 1275 cases followed over five years. Using these specific patterns, significantly stratified risk groups was found within GGS grades, supporting the notion that GGS can be further optimized. The manual labor required to identify different histologic patterns and use them to stratify patients into different risk groups is an extremely complex task requiring years of effort and repeat reviews of large amounts of visual data, often by one pathologist. The story of prostate carcinoma grading indicates different observers may identify different or incomplete sets of patterns.

Developing a grading system for a rare cancer poses a unique set of challenges. Intrahepatic cholangiocarcinoma (ICC), a cancer of the bile duct, has an incidence of 1 in 100,000 in the United States. There exists no universally accepted histopathology-based subtyping or grading system for ICC and studies classifying ICC into different risk groups have been inconsistent. A major limiting factor to subtyping ICC is that only small cohorts are available to each research institution. A study using one of the world's largest cohorts of ICC (n=184) was performed, expanding one proposed histology-based binary subtyping into four risk groups but still found no significant stratification.

There is an urgent need for efficient identification of prognostically relevant cellular and structural morphologies from limited histology datasets of rare cancers to build risk stratification systems which are currently lacking across many cancer types. Ideally, these systems should utilize a visual dictionary of histologic patterns that is comprehensive and reproducible. Once generated, such a visual dictionary is to be translatable to histopathological terms universally understood by pathologists. Computational pathology offers a new set of tools, and more importantly, a new way of approaching the historical challenges of subtyping cancers using computer vision-based deep learning, leveraging the digitization of pathology slides, and taking advantage of the latest advances in computational processing power. Presented herein is a new deep learning-based model which can create such a visual dictionary and show utility by stratifying ICC, based on morphology at the cellular level for the first time.

2. Materials and Methods

Cancer histopathology images exhibit high intra- and inter-heterogeneity because of their size (as large as tens of billions of pixels). Different spatial or temporal sampling of a tumor can have sub-populations of cells with unique genomes, theoretically resulting in visually different patterns of histology. In order to effectively cluster this extremely large amount of high intra-variance data into subsets which are based on similar morphologies, a neural network-based clustering cost-function may be combined with a novel deep convolutional architecture. The cost-function may outperform other clustering techniques on images of hand-written digits. Finally, the power and usefulness of this clustering model may be assessed by conducting survival analysis, using both Cox-proportional hazard modeling and Kaplan-Meier survival estimation, to measure if each cluster of histomorphologies has significant correlation to recurrence of cancer after resection.

2.1 Deep Clustering Convolutional Auto Encoder

A convolutional auto-encoder is made of two parts, an encoder and decoder. The encoder layers project an image into a lower dimensional representation, an embedding, through a series of convolution, pooling, and activation functions. This is described in equation 1a, where $x_i$ is an input image or input batch of images transformed by $f_\theta(\ )$, and $z_i$ is the resulting representation embedding. The decoder layers try to reconstruct the original input image from its embedding using similar functions. Mean-squared-error loss (MSE) is commonly used to optimize such a model, updating model weights ($\theta$) relative to the error between the original (input, $x_i$) image and the reconstruction (output, $x_i'$) image in a set of N images. This is shown in equation 1b.

$$\text{(a) } z_i = f_\theta(x_i) \qquad\qquad (1)$$
$$\text{(b) } \epsilon = \min_\theta \frac{1}{N} \sum_{i=1}^{N} \|x_i - x_i'\|^2$$

Although a convolutional auto-encoder can learn effective lower-dimensional representations of a set of images, it does not cluster together samples with similar morphology. To overcome this problem, the MSE-loss function may be modified by using the reconstruction-clustering error function:

$$\in = \min_\theta \frac{1}{N}\sum_{i=1}^{N}\|x_i - x_i'\|^2 + \lambda\sum_{i=1}^{N}\|z_i - c_i^*\|^2, \quad (2)$$

where $z_i$ is the embedding as defined in equation 1a, $c_i^*$ is the centroid assigned to sample $x_i$ from the previous training epoch, and $\lambda$ is a weighting parameter. Cluster assignment is determined by finding the shortest Euclidean distance between a sample embedding from epoch t and a centroid, across j centroids from epoch t−1:

$$c_i^* = \underset{j}{\operatorname{argmin}}\|z_i^t - c_j^{t-1}\|^2 \quad (3)$$

Figure 3:
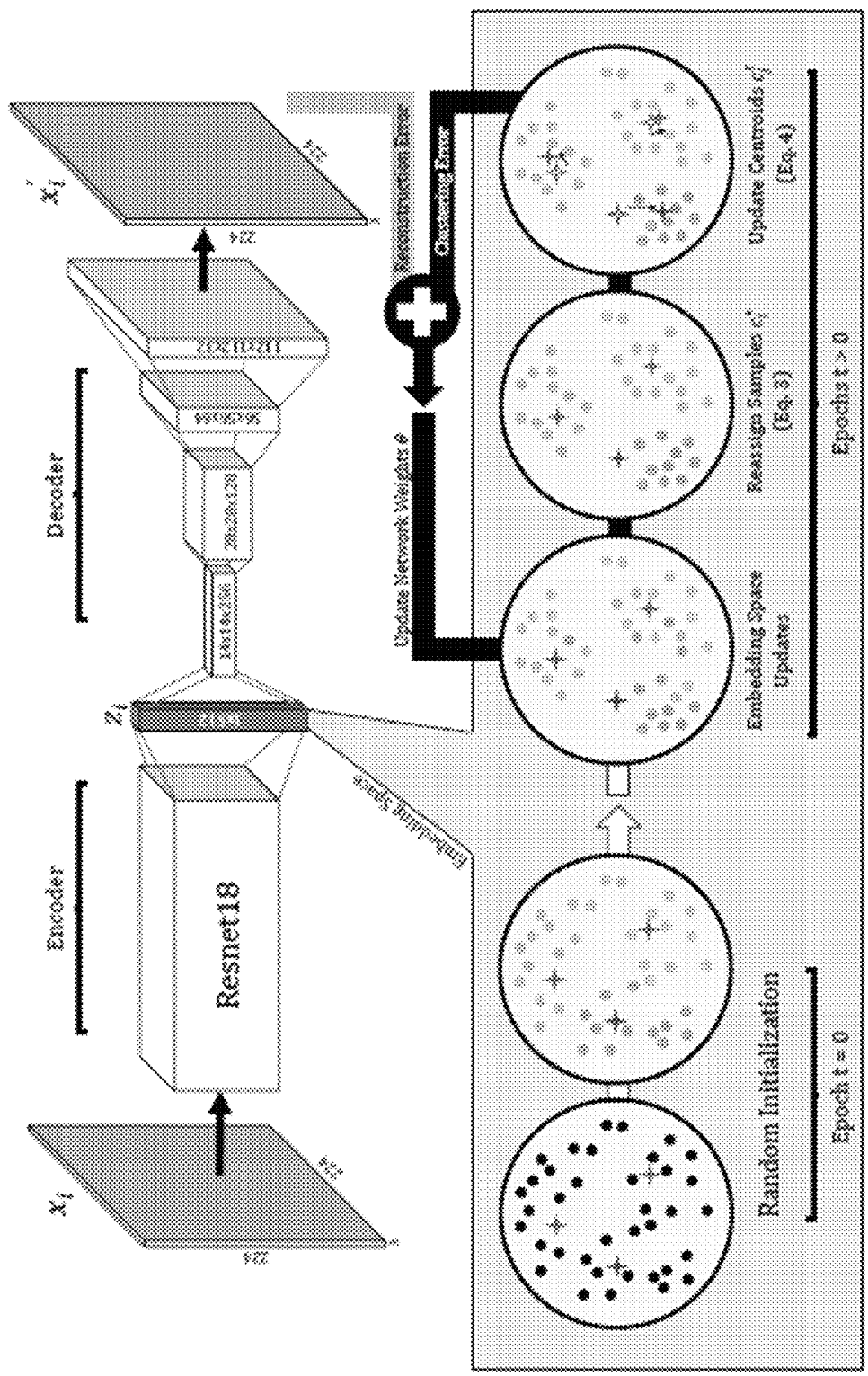
FIG. 3 depicts a block diagram of an auto-encoder model. At each iteration, the model is updated in two steps. After each forward-pass of a minibatch, the network weights are updated. At the end of each epoch, centroid locations are updated by reassigning all samples in the newly updated embedding space to the nearest centroid from the previous epoch, as described in equation 3. Finally, each centroid location is recalculated using equation 4. All centroids are randomly initialized before training.
Figure 4:
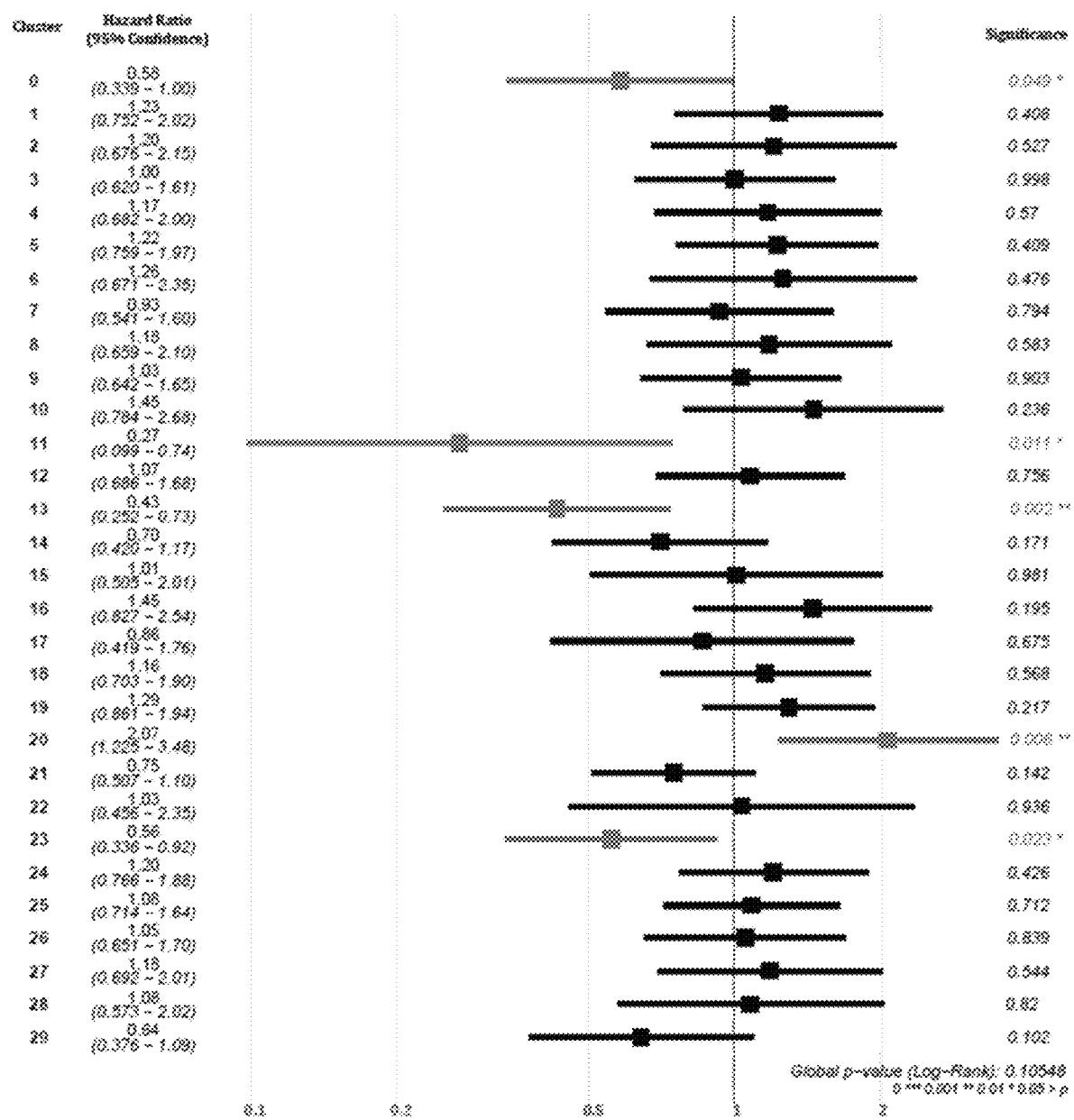
FIG. 4 depicts graphs of Multivarite Cox regression comprising all clusters as covariates. Clusters 0, 11, 13, 20, and 23 show significant hazard ratios. Log-Rank Test was used to measure significance of the entire model.

The algorithm is initialized by assigning a random cluster to each sample. Centroid locations are calculated for each cluster class by equation 4. Each mini-batch is forwarded through the model and network weights are respectively updated. At the end of an epoch, defined by the forward-passing of all mini-batches, cluster assignments are updated by equation 3, given the new embedding space. Finally, the centroid locations are updated from the new cluster assignments. This process is repeated until convergence. FIG. 3 shows a visualization of this training procedure.

$$c_j^t = \frac{\sum_{i=1}^{N} z_i z_i}{|c_j^{t-1}|} \quad (4)$$

2.2 Dataset

Two hundred forty six whole slides from patients with resected ICC without neoadjuvant chemotherapy were acquired with approval. These slides were digitized using Aperio AT2 scanners. Up-to-date retrospective data for recurrence free survival after resection was also obtained. Though currently a small sample size, this collection is the largest known retrospective ICC dataset in the world.

A library of extracted image tiles was generated from all digitized slides. First, each slide was reduced to a thumbnail, where one pixel in the thumbnail represented a 224×224 px tile in the slide at 20× magnification. Next, using Otsu thresholding on the thumbnail, a binary mask of tissue (positive) vs. background (negative) was generated. Connected components below 10 thumbnail pixels in tissue were considered background to exclude dirt or other insignificant masses in the digitized slide. Finally, mathematical morphology was used to erode the tissue mask by one thumbnail pixel to minimize tiles with partial background. To separate the problem of cancer subtyping, as discussed in this paper, from the problem of tumor segmentation, the areas of tumor were manually annotated using a web-based whole slide viewer. Using a touchscreen, a pathologist painted over regions of tumor to identify where tiles should be extracted. FIG. 1 illustrates an example of this annotation. Tiles were added to the training set if they lay completely within these regions of identified tumor.

2.2.1 Quality Control

Figure 2:
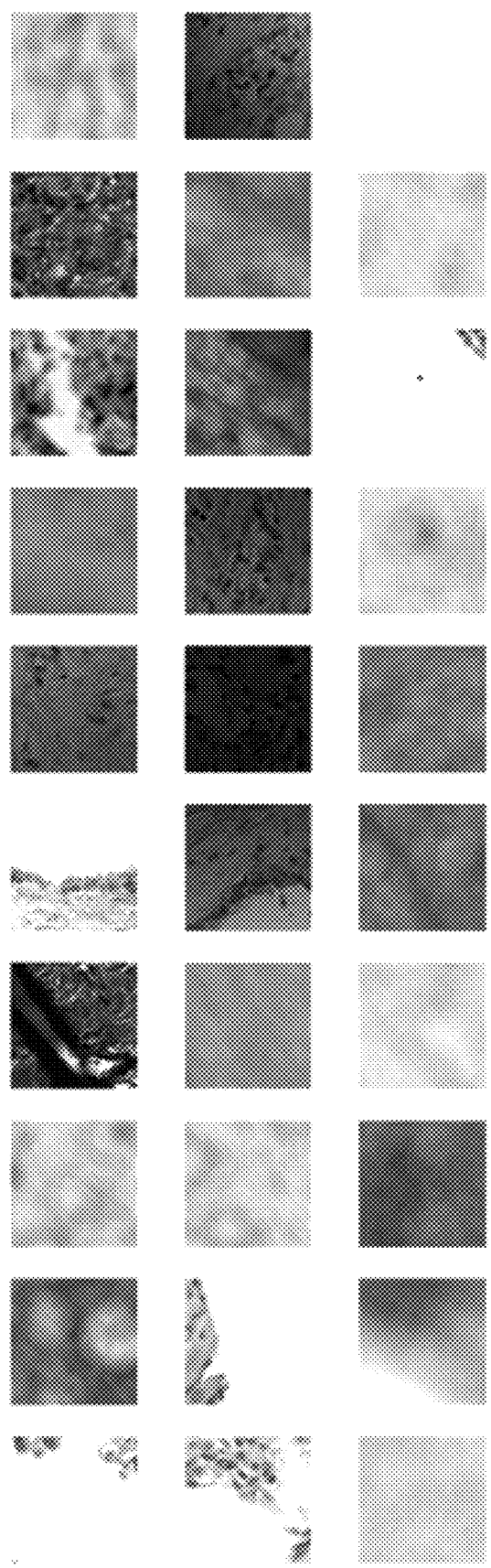
FIG. 2 depicts screenshots of tiles from biomedical images. Randomly selected examples of tiles excluded by the quality control algorithm. Interestingly, this method also helped identify tiles with ink stains, folds, and those which include partial background, tiles which the first stage of tile generation was designed to exclude as much as possible.

Scanning artifacts such as out-of-focus areas of an image can impact model performance on smaller datasets. A deep convolutional neural network was trained to detect blurred tiles to further reduce noise in the dataset. Training a detector on real blur data was beyond the scope of this study because obtaining annotations for blurred regions in the slide is unfeasible and would also create a strong class imbalance between blurred and sharp tiles. To start, half of the tiles were artificially blurred by applying a Gaussian-blur filter with a random filter radius ranging from 1 to 10. The other half were labeled "sharp" and no change was made to them. A ResNet18 was trained to output an image quality score by regressing over the values of the applied filter radius using MSE. A value of 0 was used for images in the sharp class. Finally, a threshold was manually selected to exclude blurred images based on the output value from the detector. FIG. 2 shows randomly selected examples of tiles excluded based on the blur detector.

2.3 Architecture and Training

Presented herein is a novel convolutional autoencoder architecture to optimize performance in image reconstruction. The encoder is a ResNet18 which was pretrained on ImageNet. The parameters of all layers of the encoder updated when training the full model on pathology data. The decoder is comprised of five convolutional layers, each with a padding and stride of 1, for keeping the tensor size constant with each convolution operation. Upsampling is used before each convolution step to increase the size of the feature map. Empirically, batch normalization layers did not improve reconstruction performance and thus, were excluded.

Two properties of the model are to be optimized: first, the weights of the network, $\theta$, and then locations of the cluster centers, or centroids, in the embedding space, $C_j$. In order to minimize equation 2 and update $\theta$, the previous training epoch's set of centroids, $C_j^{t-1}$, is used. In the case of the first training epoch, centroid locations are randomly assigned upon initialization. A training epoch is defined by the forward-passing of all mini-batches once through the network. After $\theta$ have been updated, all samples are reassigned to the nearest centroid using equation 3. Finally, all centroid locations are updated using equation 4 and used in the calculations of the next training epoch. FIG. 3 illustrates this process and architecture.

All training was done on DGX-1 compute nodes (NVIDIA Corp., Santa Clara, Calif.) using PyTorch 0.4 on Linux CentOS7. The model was trained using Adam optimization for 125 epochs, a learning rate of 1e$^{-2}$, and weight decay of 1e$^{-4}$. The learning rate was decreased by 0.1 every 50 epochs. The clustering weight, $\lambda$, was set to 0.4. Finally, to save on computation time, 500,000 tiles were randomly sampled from the complete tile library to train each model, resulting in approximately 2000 tiles from each slide on average.

2.3.1 Survival Analysis

In order to measure the usefulness and effectiveness of the clustered morphological patterns, slide-level survival analysis may be conducted, based on which patterns occurred on a given digital slide to its associated outcome data. Each cluster was considered a binary covariate. If one or more tile(s) from a given cluster existed in a slide, the slide was considered positive for the morphological pattern defined by that cluster. A multivariate Cox regression was used to model the impact of all clusters on recurrence based on this binarized representation of each cluster for each patient:

$$H(t) = h_o e^{b_1 x_1 + b_2 x_2 + \ldots + b_j x_j}, \quad (5)$$

where $H(t)$ is the hazard function dependent on time t, $h_o$ is a baseline hazard, and covariates $(x_1, x_2, \ldots x_j)$ have coefficients $(b_1, b_2, \ldots b_j)$. A covariate's hazard ratio is defined by $e^{b_j}$. A hazard ratio greater than one indicates that tiles in that cluster contribute to a worse prognosis. Conversely, a hazard ratio less than one contributes to a good prognostic factor. To measure significance in the survival model, p-values based on the Wald statistic are presented for each covariate.

A univariate Cox Regression was also performed on each cluster. Those measured as significant (p<0.05) were used to build multivariate Cox regressions for each combination. The results are described in Table 2. Finally, Kaplan-Meier curves of the prognostically significant clusters may be shown by estimating the survival function S(t):

$$S(t) = \prod_{t_i < t} \frac{n_i - d_i}{n_n}, \qquad (6)$$

where $d_i$ are the number of recurrence events at time t and $n_i$ are the number of subjects at risk of death or recurrence prior to time t. This binary Kaplan-Meier analysis was done for each cluster, and stratification was measured to be significant using a standard Log-Rank Test.

2.3.2 Histologic Interpretation

Clusters measured to be significantly correlated with survival based on the Cox analysis were assigned clinical descriptors by a pathologist using standard histological terminology as shown in table 1. For 20 random tiles of each of those clusters, a semi-quantitative assessment of histological elements comprising each tile was recorded. A major feature was defined as presence of a histological element in >50 percent of a single tile area in greater than 10 tiles of a cluster. Minor features were defined as histological elements in >50 percent of the tile area in 8-9 tiles of a cluster. A major tumor histology type was defined for a cluster when >50 percent of the tiles containing any amount of tumor were of the same histologic description.

TABLE 1

Standard pathology terms were used to build a description of the most common histologic elements appearing in each cluster.

| Category | Histologic Description | |
|---|---|---|
| Debris | Granular fibrinoid material, amorphous | |
| | Granular fibrinoid material, ghost cells | |
| | Granular fibrinoid material, pkynotic nuclei | |
| | Nectroic tumor | |
| | Red blood cells | |
| Extracellular Matrix | Collagen, linear fascicles | |
| | Collagen, wavy fascicles | |
| | Collagen, bundles in cross section | |
| | Collagen, amorphous | |
| | Mucin | |
| Hematolymphoid | Neutrophils | |
| | Lymphocytes | |
| | Histiocytes | |
| Other Non-Neoplastic Elements | Vessel | |
| | Nerve | |
| | Hepatocytes | |
| | Fibroblasts | |
| Tumor Histology Type | Tubular | High nuclear:cytolasmic ratio |
| | | Low nuclear:cytolasmic ratio |
| | Solid | High nuclear:cytolasmic ratio |
| | | Low nuclear:cytolasmic ratio |
| | Too limited to classify | |

2.4 Results

The multivariate Cox model comprising all clusters showed significance in the hazard ratios of clusters 0, 11, 13, 20, and 23 (p<0.05). Cluster 20 showed a decrease in prognostic risk and clusters 0, 11, 13, and 23 showed an increase in prognostic risk. However, the overall model was not measured to be significant (Likelihood Ratio Test: p=0.106, Wald Test: p=0.096, Log-Rank Test: p=0.076).

Clusters 0, 11, and 13 were measured to be significant (p<0.05) by the univariate Cox Regression, all with a positive influence in prognosis when compared to samples negative for those clusters. Table 2 shows the individual univariate hazard ratios for Clusters 0, 11, 13 and all combinations for a multivariate Cox regression when considering only those significant clusters. For these multivariate models, the Wald Test, Likelihood Ratio Test, and Log-Rank Test, all showed significance of p<0.05.

Figure 5:
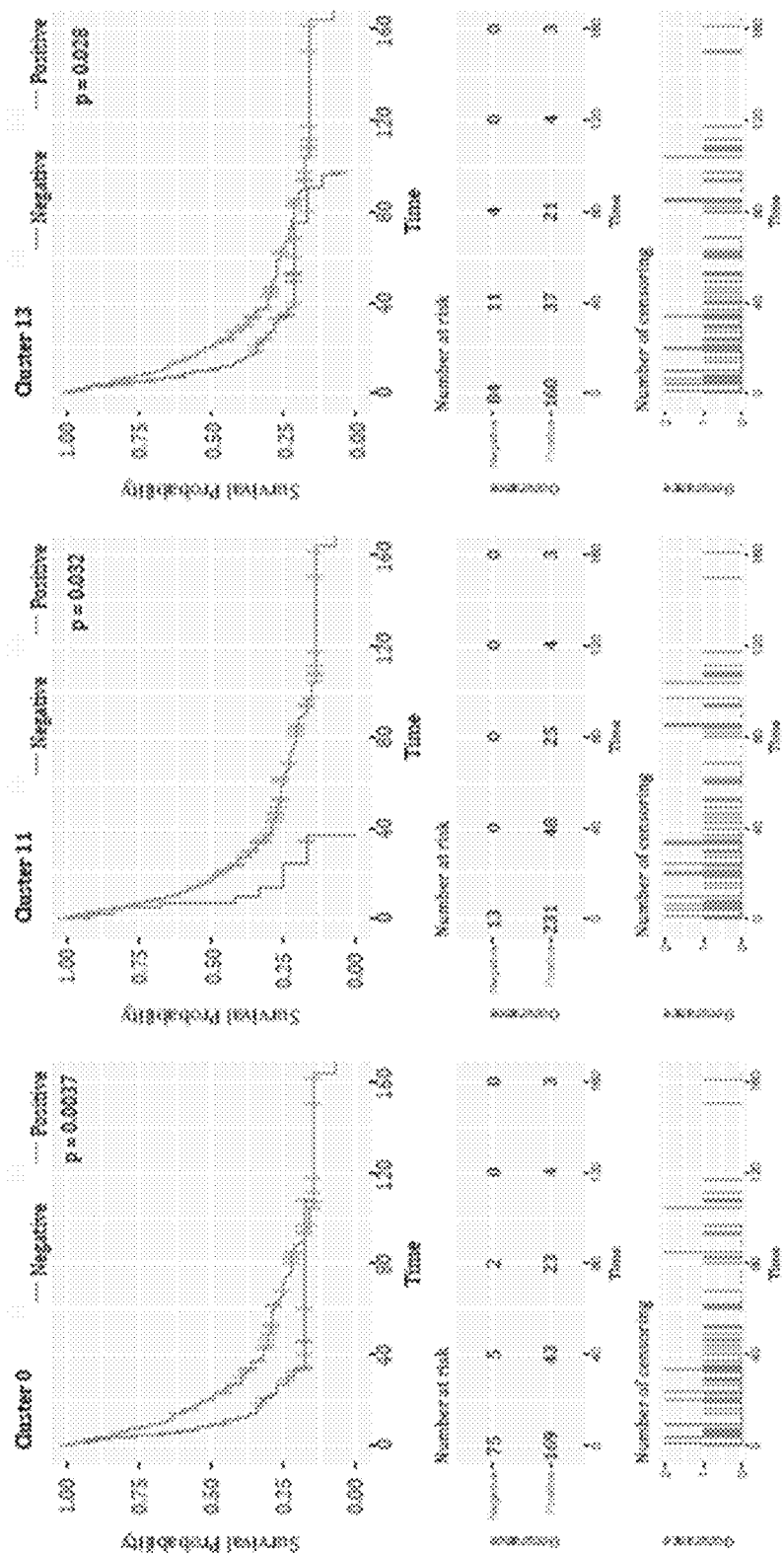
FIG. 5 depicts graphs of Kaplan-Meier survival curves. The top panels show Kaplan-Meier survival curves across time (months) for clusters 0, 11, and 13 with reported stratification significance based on the Log-Rank Test. The middle panel shows the amount of samples in each stratified class over time and the bottom panel indicates points at which censored events occur. Each analysis shows a significantly positive prognostic factor for samples positive for the given cluster.
Figure 6:
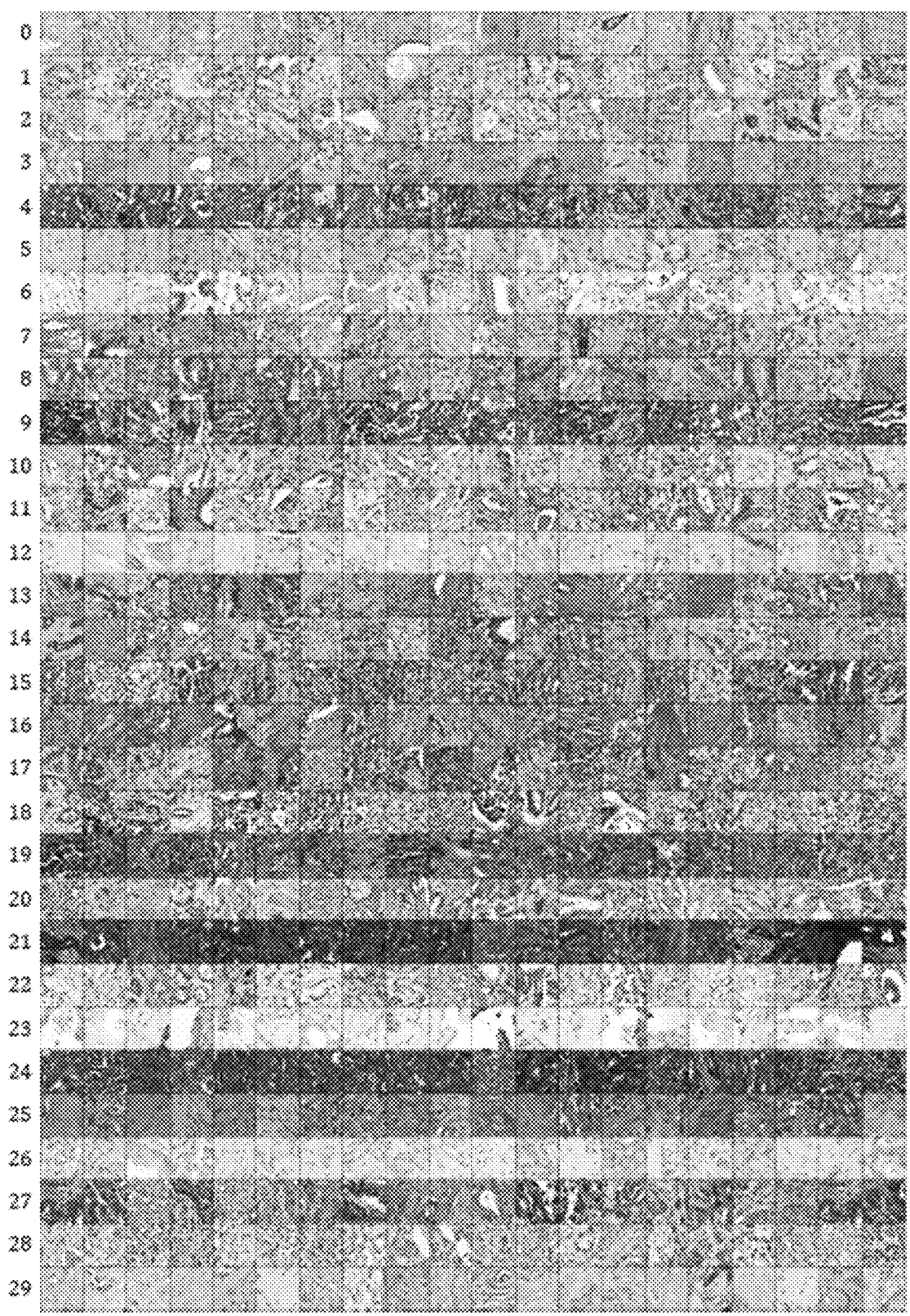
FIG. 6 depicts a screenshot of sampled tiles. Each row depicts 20 randomly sampled tiles for each cluster.

For the significant clusters from the univariate analysis, FIG. 5 shows Kaplan-Meier plots for patients stratified into positive and negative groups. A Log-Rank Test p-value of less than 0.05 shows significance in stratification in the estimated survival curves. Each vertical tick indicates a censored event.

Semi-quantitative histologic analysis of the random 20 tiles selected from the clusters of significance showed that only cluster 0 met criteria for a major feature, consisting of the extracellular matrix component, collagen, specifically arranged in linear fascicles. Collagen was a minor feature for one other cluster (23) and both of these clusters (0, 23) had an decrease in hazard ratio on univariate survival analysis. No tumor histology, as defined in table 1, met the criterion as a major feature. One tumor histology was a minor feature of one cluster, clusters 13 had 9 tiles with more than 50 percent solid tumor histology with low nuclear:cytoplasmic ratio and this cluster indicated a decrease in prognostic risk. No other major or minor features were identified.

Although tumor content was not a major or minor feature of most clusters, tumor content of any volume and histologic description was present in 35-75 percent of tiles for each cluster. Major tumor histology types were seen in two clusters: cluster 0 had 4/7 (57 percent) of tiles containing tubular type, and cluster 23 had 7/12 (58 percent) of tiles containing tubular high nuclear:cytoplasmic ratio type.

TABLE 2

Hazard ratios ($e^{bj}$) for prognositically significant clusters/when modelling a univariate Cox regression and their combinations in multivariate models. The values in parenthesis indicate bounds for 95% confidence intervals based on cumulative hazard.

| | | Multivariate | | |
|---|---|---|---|---|
| | Univariate | 0 + 11 | 0 + 13 | 11 + 13 | 0 + 11 + 13 |
| Cluster 0 | 0.618*** (0.447-0.855) | 0.644*** (0.463-0.895) | 0.675** (0.459-0.993) | | 0.725 (0.489-1.075) |
| Cluster 11 | 0.515** (0.280-0.951) | 0.598 (0.320-1.116) | | 0.494** (0.267-0.915) | 0.560* (0.297-1.056) |
| Cluster 13 | 0.750* (0.517-0.961) | | 0.855 (0.591-1.127) | 0.694** (0.508-0.946) | 0.813 (8.561-1.178) |
| Wald Test | | 11.36*** | 9.15** | 9.75*** | 12.51*** |
| Likelihood Ratio Test | | 10.19*** | 8.59** | 8.86** | 11.37*** |
| Score (Log-Rank) Test | | 11.67*** | 9.31*** | 9.99*** | 12.85*** |

Note:
Significance codes: 0 '*' 0.001 '' 0.01 '*' 0.05 '.' 0.1 ' ' 1

2.5 Conclusion

2.5.1 Technical Contribution

This model offers a novel approach for identifying histological patterns of potential prognostic significance, circumventing the tasks of tedious tissue labeling and laborious human evaluation of multiple whole slides. As a point of comparison, a recent study showed that an effective prognostic score for colorectal cancer was achieved by first segmenting a slide into eight predefined categorical regions using supervised learning. Methods such as this limit the model to pre-defined histologic components (tumor, non-tumor, fat, debris, etc) and the protocol may not extend to extra-colonic anatomic sites lacking a similar tumor specific stroma interactions. In contrast, the design of the model lacks predefined tissue classes, and has the capability to analyze n clusters, thus removing potential bias introduced by training and increasing flexibility in application of the model.

2.5.2 Histology

By semi-quantitative assessment of the histologic components of the tiles in clusters with prognostic significance, tumor cells were discovered to be not a major feature in any cluster, whereas two clusters had connective tissue (stroma) comprised of extracellular matrix (collagen) as a major/minor feature.

Tumor stroma, the connective tissue intervening between tumor cell clusters in tissue comprised of matrix and collagen, is known to play an integral role in cancer growth, angiogenesis, and metastasis, but is not used in tumor grading or prognostication systems, which tend to focus on tumor attributes such as nuclear features, cellular architecture, and invasive behavior. Research specifically in ICC has supported the important biological role of tumor associated stroma in tumor progression by analyzing unseen paracrine factors. Recently, a deep learning-based algorithm used tumor associated stroma, not tumor cells, to stratify ductal carcinoma in situ of the breast by grade. In the present study, stroma was found to be a major/minor feature of two significant clusters which this raises the possibility that the stroma microenvironment could have distinct morphologic characteristics that could be detectable routinely and potentially prognostically significant.

B. Unsupervised Subtyping of Cholangiocarcinoma Using a Deep Clustering Convolutional Autoencoder Unlike common cancers, such as those of the prostate and breast, tumor grading in rare cancers is difficult and largely undefined because of small sample sizes, the sheer volume of time and experience needed to undertake such a task, and the inherent difficulty of extracting human-observed patterns. One of the most challenging examples is intrahepatic cholangiocarcinoma (ICC), a primary liver cancer arising from the biliary system, for which there is well-recognized tumor heterogeneity and no grading paradigm or prognostic biomarkers. Presented herein is a new unsupervised deep convolutional autoencoder-based clustering model that groups together cellular and structural morphologies of tumor in 246 digitized whole slides, based on visual similarity. Clusters based on this visual dictionary of histologic patterns are interpreted as new ICC subtypes and evaluated by training Cox-proportional hazard survival models, resulting in statistically significant patient stratification.

1. Introduction

Cancer subtyping is an important tool used to determine disease prognosis and direct therapy. Commonly occurring cancers, such as those of breast and prostate, have well established subtypes, validated on large sample sizes. The manual labor required to subtype a cancer, by identifying different histologic patterns and using them to stratify patients into different risk groups, is an extremely complex task requiring years of effort and repeat review of large amounts of visual data, often by one pathologist.

Subtyping a rare cancer poses a unique set of challenges. Intrahepatic cholangiocarcinoma (ICC), a primary liver cancer emanating from the bile duct, has an incidence of approximately 1 in 160,000 in the United States, and rising. Currently, there exists no universally accepted histopathology-based subtyping or grading system for ICC and studies classifying ICC into different risk groups have been inconsistent. A major limiting factor to subtyping ICC is that only small cohorts are available to each institution. There is an urgent need for efficient identification of prognostically relevant cellular and structural morphologies from limited histology datasets of rare cancers, such as ICC, to build risk stratification systems which are currently lacking across many cancer types. Computational pathology offers a new set of tools, and more importantly, a new way of approaching the historical challenges of subtyping cancers using computer vision-based deep learning, leveraging the digitization of pathology slides, and taking advantage of the latest advances in computational processing power. Presented herein is a new deep learning-based model which uses a unique neural network-based clustering approach to group together histology based on visual similarity. With this visual dictionary, clusters may be interpreted as subtypes and train a survival model, showing significant results for the first time in ICC.

2. Materials and Methods

Cancer histopathology images exhibit high intra- and inter-heterogeneity because of their size (as large as tens of billions of pixels). Different spatial or temporal sampling of a tumor can have sub-populations of cells with unique genomes, theoretically resulting in visually different patterns of histology. In order to effectively cluster this extremely large amount of high intra-variance data into subsets which are based on similar morphologies, a neural network-based clustering cost-function, shown to outperform clustering techniques on images of hand-written digits, may be combined with a novel deep convolutional architecture. It is hypothesized that a k-means style clustering cost function under the constraint of image reconstruction which is being driven by adaptive learning of filters will produce clusters of histopathology relevant to patient outcome. Finally, the performance and usefulness of this clustering model may be assessed by conducting survival analysis, using both Cox-proportional hazard modeling and Kaplan-Meier survival estimation, to measure if each cluster of histomorphologies has significant correlation to recurrence of cancer after resection. While other studies have performed unsupervised clustering of whole slide tiles based on image features, they have been used to address the problem of image segmentation and relied on clustering a developed latent space. This study adjusts the latent space with each iteration of clustering.

2.1 Deep Clustering Convolutional Autoencoder

A convolutional auto-encoder is made of two parts, an encoder and decoder. The encoder layers project an image into a lower dimensional representation, an embedding, through a series of convolution, pooling, and activation functions. This is described in Eq. 1a, where $x_i$ is an input image or input batch of images transformed by $f_\theta(\ )$ and $z_i$ is the resulting representation embed-ding. The decoder layers try to reconstruct the original input image from its embedding using similar functions. Mean-squared-error loss (MSE) is commonly used to optimize such a model, updating model weights (θ) relative to the error between the original (input, $x_i$) image and the reconstruction (output, $x_i'$) image in a set of N images. This is shown in Eq. 1b.

$$(a)\ z_i = f_\theta(x_i) \quad (1)$$

$$(b)\ \epsilon = \min_\theta \frac{1}{N}\sum_{i=1}^{N} \|x_i - x_i'\|^2$$

Although a convolutional auto-encoder can learn effective lower-dimensional representations of a set of images, it does not cluster together samples with similar morphology. To overcome this problem, the reconstruction-clustering error function may be used:

$$\epsilon = \min_\theta \frac{1}{N}\sum_{i=1}^{N}\|x_i - x_i'\|^2 + \lambda \sum_{i=1}^{N}\|z_i - c_i^*\|^2, \quad (2)$$

where $z_i$ is the embedding as defined in Eq. 1a, $c_i^*$ is the centroid assigned to sample $x_i$ from the previous training epoch, and λ is a weighting parameter. Cluster assignment is determined by finding the shortest Euclidean distance between a sample embedding from epoch t and a centroid, across j centroids from epoch t−1:

$$c_i^* = \arg\min_j \|z_i^t - c_j^{t-1}\|^2 \quad (3)$$

Figure 7:
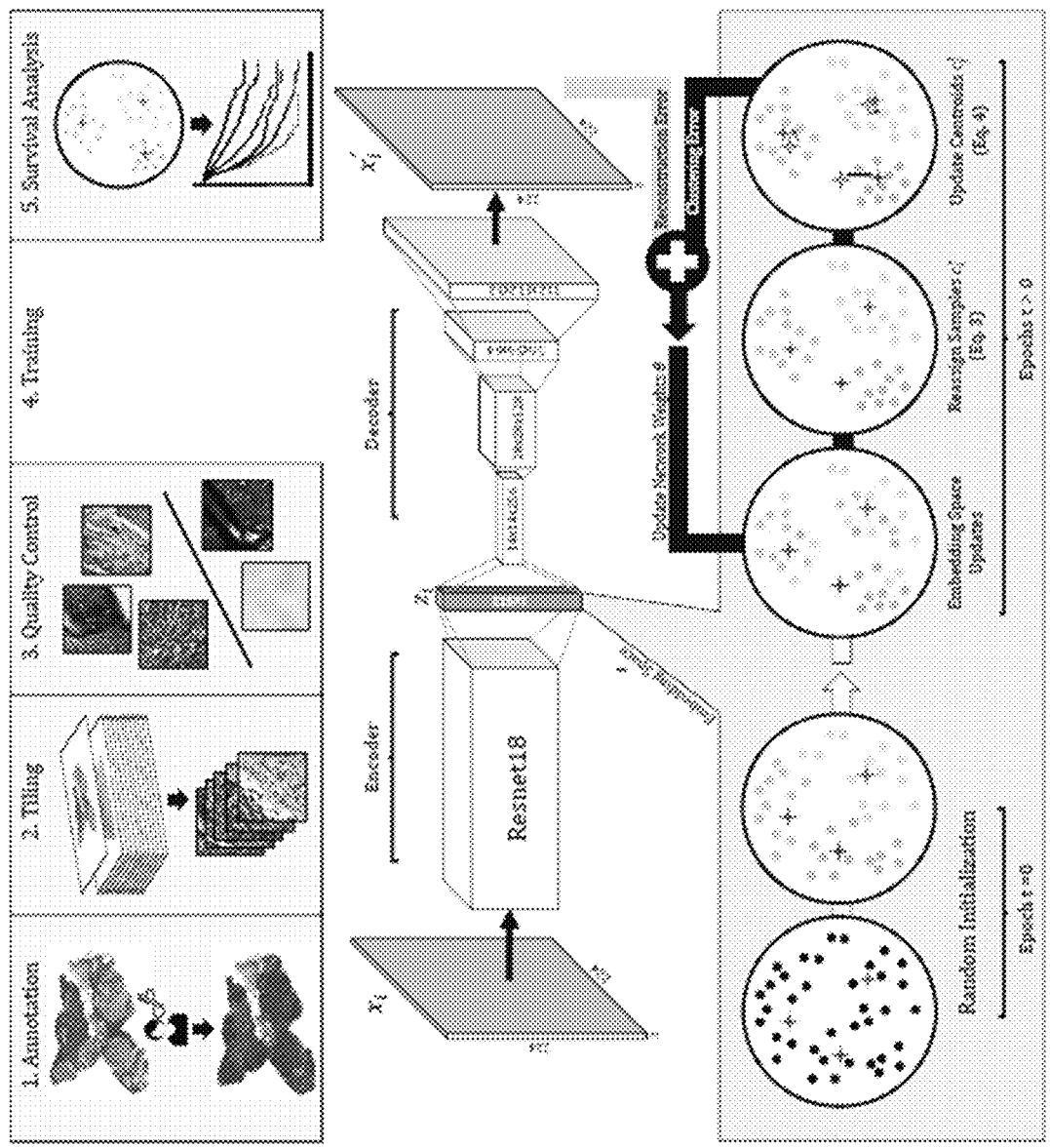
FIG. 7 depicts a block diagram of an auto-encoder model. Training the model is the fourth phase of the complete pipeline. At each iteration, the model is updated in two steps. After each forward-pass of a minibatch, the network weights are updated. At the end of each epoch, centroid locations are updated by reassigning all samples in the newly updated embedding space to the nearest centroid from the previous epoch, as described in Eq. 3. Finally, each centroid location is recalculated using Eq. 4. All centroids are randomly initialized before training.

The algorithm is initialized by assigning a random cluster to each sample. Centroid locations are calculated for each cluster class by Eq. 4. Each mini-batch is forwarded through the model and network weights are respectively updated. At the end of an epoch, defined by the forward-passing of all mini-batches, cluster assignments are updated by Eq. 3, given the new embedding space. Finally, the centroid locations are updated from the new cluster assignments. This process is repeated until convergence. FIG. 7 shows a visualization of this training procedure.

$$c_j^t = \frac{\sum_{t=1}^{N} z_i}{|c_j^{t-1}|} \quad (4)$$

2.2 Dataset

Whole slide images were obtained. In total, 246 patients with resected ICC without neoadjuvant chemotherapy were included in the analysis. All slides were digitized using Aperio AT2 scanners (Leica Biosystems; Wetzlar Germany). Up-to-date retrospective data for recurrence free survival after resection were also obtained. Though currently a small sample size when compared to commonly occurring cancers, this collection is the largest known ICC dataset in the world.

A library of extracted image tiles was generated from all digitized slides. First, each slide was reduced to a thumbnail, where one pixel in the thumbnail represented a 224 224px tile in the slide at 20× magnification. Next, using Otsu thresholding on the thumbnail, a binary mask of tissue (positive) vs. background (negative) was generated. Connected components below 10 thumbnail pixels in tissue were considered background to exclude dirt or other insignificant masses in the digitized slide. Finally, mathematical morphology was used to erode the tissue mask by one thumbnail pixel to minimize tiles with partial background. To separate the problem of cancer subtyping, as discussed in this paper, from the problem of tumor segmentation, the areas of tumor were manually annotated using a web-based whole slide viewer. Using a touchscreen, a pathologist painted over regions of tumor to identify where tiles should be extracted. Tiles were added to the training set if they lay completely within these regions of identified tumor.

Quality Control. Scanning artifacts such as out-of-focus areas of an image can impact model performance on smaller datasets. A deep convolutional neural net-work was trained to detect blurred tiles to further reduce noise in the dataset. Training a detector on real blur data was beyond the scope of this study because obtaining annotations for blurred regions in the slide is unfeasible and would also create a strong class imbalance between blurred and sharp tiles. The data may be prepared for training a blur detector. To start, half of the tiles were artificially blurred by applying Gaussian-blur with a random radius ranging from 1 to 10. The other half were labeled "sharp" and no change was made to them. A ResNet18 was trained to output an image quality score by regressing over the values of the applied filter radius using MSE. A value of 0 was used for images in the sharp class. Finally, a threshold was manually selected to exclude blurred tiles based on the output value of the detector.

2.3 Architecture and Training

Presented herein is a novel convolutional autoencoder architecture to optimize performance in image reconstruction. The encoder is a ResNet18 pretrained on ImageNet. The parameters of all layers of the encoder updated when training the full model on pathology data. The decoder is comprised of five convolutional layers, each with a padding and stride of 1, for keeping the tensor size constant with each convolution operation. Upsampling is used before each convolution step to increase the size of the feature map. Empirically, batch normalization layers did not improve reconstruction performance and thus, were excluded.

Two properties of the model need to be optimized: first, the weights of the network, θ, and then locations of the cluster centers, or centroids, in the embedding space, $C_j$. In order to minimize Eq. 2 and update θ, the previous training epoch's set of centroids, $C_j^{t-1}$, is used. In the case of the first training epoch, centroid locations are randomly assigned upon initialization. A training epoch is defined by the forward-passing of all mini-batches once through the network. After θ have been updated, all samples are reassigned to the nearest centroid using Eq. 3. Finally, all centroid locations are updated using Eq. 4 and used in the calculations of the next training epoch. FIG. 7 illustrates this process and architecture.

All training was done on DGX-1 compute nodes (NVIDIA, Santa Clara, Calif.) using PyTorch 0.4 on Linux CentOS 7. The models were trained using Adam optimization for 150 epochs, a learning rate of $1e^{-2}$, and weight decay of $1e^{-4}$. To save on computation time, 100,000 tiles were randomly sampled from the complete tile library to train each model, resulting in approximately 400 tiles from each slide on average. The following section describes the selection process for hyper-parameters λ and J, clustering weight and number of clusters, respectively.

Experiments. The Calinski-Harabaz Index (CHI), also known as the variance ratio criterion, was used to measure cluster performance, defined by measuring the ratio of between-clusters dispersion mean and within-cluster dispersion. A higher CHI indicates stronger cluster separation and lower variance within each cluster.

A series of experiments were conducted to optimize $\lambda$ and J for model selection. With $\lambda$ set to 0.2, five different models were trained with varying J clusters, ranging from 5 to 25. Secondly, five models were trained with varying k, from 0.2 to 1, with J set to the value corresponding with the highest CHI from the previous experiment. A final model was trained with optimized J and $\lambda$ to cluster all tiles in the dataset. Each slide was assigned a class based on which cluster was measured to occupy the largest area in the slide. This approach is used because it is similar to how a pathologist would classify a cancer into a subtype based on the most commonly occurring histologic pattern.

Survival Modeling.

In order to measure the usefulness and effectiveness of the clustered morphological patterns, slide-level survival analysis may be conducted, based on the assigned classes to associated outcome data. Survival data often includes right-censored time durations. This means that the time of event of interest, in this case recurrence detected by radiology, is unknown for some patients. However, the time duration of no recurrence, as measured until the patient's last follow-up date, is still useful information which can be harnessed for modeling. Cox-proportional hazard modeling is a commonly used model to deal with right-censored data:

$$H(t) = h_o e^{b_j x_i}, \quad (5)$$

where H(t) is the hazard function dependent on time t, $h_o$ is a baseline hazard, and covariate $x_i$ is weighted by coefficient $b_i$. The hazard ratio, or relative likelihood of death, is defined by $e^{b_j}$. A hazard ratio greater than one indicates that a cluster class contributes to a worse prognosis. Conversely, a hazard ratio less than one contributes to a good prognostic factor. To measure significance in the survival model, p-values based on the Wald statistic, likelihood ratio, and log-rank test are presented for each model.

Five univariate cox models were trained, each with one cluster class held out as a reference to measure impact of survival relative to the other classes. Further, Kaplan-Meier curves are shown to illustrate survival outcomes within each class by estimating the survival function S(t):

$$S(t) = \prod_{t_i < t} \frac{n_i - d_i}{n_n}, \quad (6)$$

where $d_i$ are the number of recurrence events at time t and $n_1$ are the number of subjects at risk of death or recurrence prior to time t.

3. Results

Results of model selection by varying $\lambda$ and J are shown in Table 1. Best performance was measured by CHI with $\lambda$ set to 0.2 and J set to 5.

Figure 8:
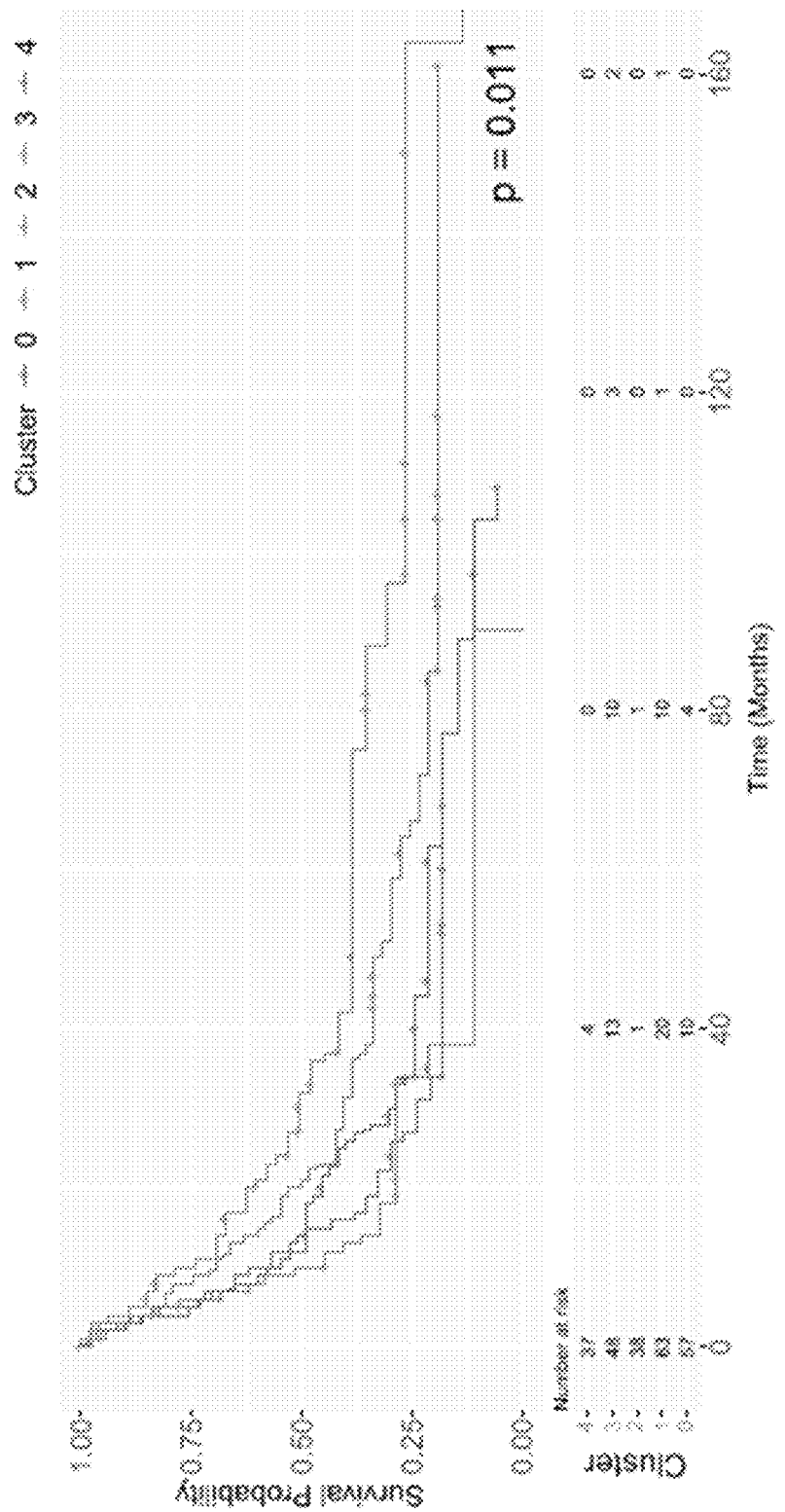
FIG. 8 depicts a graph of Kaplan-Meier visualization of survival probabilities for each patient classified into one of the five cluster classes produced by the unsupervised model. Patients with high presence of tissue in cluster 3 have a better recurrence-free survival than those with clusters 2 or 4.

Cox-proportional hazard modeling showed strong significance in recurrence-free survival between patients when classifying their tissue based on clusters produced by the unsupervised model. Table 2 details the hazard ratios of each cluster, relative to the others in five different models. Each model has one cluster held as a reference to produce the hazard ratio. FIG. 8 shows a visualization of the survival model using Kaplan-Meier analysis.

TABLE 1

The Calinski-Harabaz Index (CHI) was highest when the model was set to 5 clusters (J) and clustering weight ($\lambda$) was set to 0.2 This indicates the model which best produces clusters that are dense and well-separated from each other.

| J | 5 | 10 | 15 | 20 | 25 |
|---|---|---|---|---|---|
| CHI | 3863 | 2460 | 2064 | 957 | 1261 |
| $\lambda$ | 0.2 | 0.4 | 0.6 | 0.8 | 1.0 |
| CHI | 4314 | 3233 | 3433 | 3897 | 3112 |

TABLE 2

Hazard ratios show strong significance as measured by three different statistical tests. This indicates that the cluster classes produced by the unsupervised model suggest clinical usefulness. If each cluster class is considered a cancer subtype, five subtypes is the strongest stratification seen in the literature thus far.

| | Hazard ratio Dependent variable: | | | | |
|---|---|---|---|---|---|
| Cluster | 0 | 1 | 2 | 3 | 4 |
| 0 | Reference | 1.332*** (0.206) | 0.789*** (0.250) | 1.788*** (0.237) | 0.873*** (0.235) |
| 1 | 0.751*** (0.206) | Reference | 0.593*** (0.251) | 1.342*** (0.236) | 0.655*** (0.235) |
| 2 | 1.267*** (0.250) | 1.688*** (0.251) | Reference | 2.265*** (0.277) | 1.106*** (0.272) |
| 3 | 0.559*** (0.237) | 0.745*** (0.236) | 0.441 (0.277) | Reference | 0.488* (0.264) |
| 4 | 1.145*** (0.235) | 1.526*** (0.235) | 0.904*** (0.272) | 2.048*** (0.264) | Reference |
| Wald Test | 12.740** | 12.740** | 12.740** | 12.740** | 12.740** |
| LR Test | 13.183** | 13.183** | 13.183** | 13.183** | 13.183** |
| Logrank Test | 13.097** | 13.097** | 13.097** | 13.097** | 13.097** |

Note: *p < 0.1; p < 0.05; *p < 0.01

4. Conclusion

This model offers a novel approach for identifying histological patterns of potential prognostic significance, circumventing the tasks of tedious tissue labeling and laborious human evaluation of multiple whole slides. As a point of comparison, a recent study showed that an effective prognostic score for colorectal cancer was achieved by first segmenting a slide into eight predefined categorical regions using supervised learning. These kind of models limit the model to pre-defined histologic components (tumor, fat, debris, etc.) and the protocol may not extend to extra-colonic anatomic sites lacking a similar tumor specific stroma interactions. In contrast, the design of the model lacks predefined tissue classes, and has the capability to analyze any number of clusters, thus removing potential bias introduced by training and increasing flexibility in application of the model. Novel subtyping approaches like this may lead to better grading of cholangiocarcinoma and improve treatment and outcome of patients.

C. Systems and Method for Clustering Images Using Auto-Encoder Models

Figure 9A:
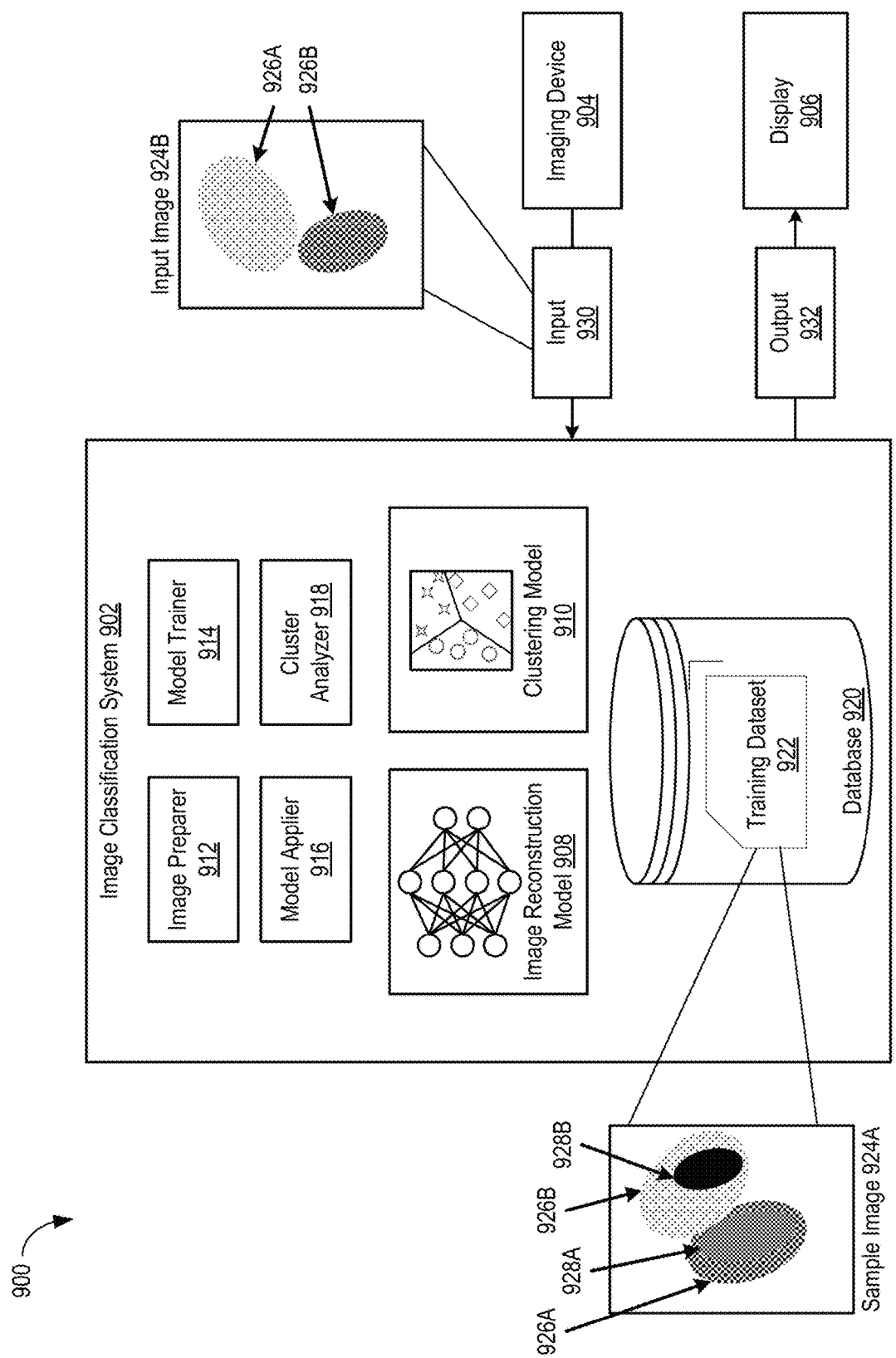
FIG. 9A depicts a block diagram of a system for clustering images using autoencoder models.

Referring now to FIG. 9A, depicted is a block diagram of a system 900 for clustering images using autoencoder models. In brief overview, the system 900 may include at least one image classification system 902 (sometimes generally referred to as a computing system), at least one imaging device 904, and at least one display 906, among others. The image classification system 902, the imaging device 904, and the display 906 may be communicatively coupled to one another. The image classification system 902 may include at least one image reconstruction model 908, at least one clustering model 910, at least one image preparer 912, at least one model trainer 914, at least one model applier 916, at least one cluster analyzer 918, and at least one database 920, among others. The at least one database 920 may include or maintain at least one training dataset 922. Each of the components in the system 900 listed above may be implemented using hardware (e.g., one or more processors coupled with memory) or a combination of hardware and software as detailed herein in Section D. Each of the components in the system 900 may implement or execute the functionalities detailed herein, such as those described in Sections A and B.

In further detail, the image classification system 902 itself and the components therein, such as the image preparer 912, the model trainer 914, the model applier 916, and the cluster analyzer 918, may have a runtime mode (sometimes referred herein as an evaluation mode) and a training mode. Under training mode, the image classification system 902 may train or otherwise update the image reconstruction model 908 and the clustering model 910 using the training dataset 922 maintained on the database 920. Under runtime mode, the image classification system 902 may apply the image reconstruction model 908 and the clustering model 910 using acquired images.

The image preparer 912 executing on the image classification system 902 may receive, retrieve, or identify at least one image to feed to the image reconstruction model 908. When in training mode, the image preparer 912 may access the database 920 to identify at least one sample image 924A included in the training dataset 922 maintained therein. The training dataset 922 may include one or more sample images 924A. In some embodiments, each sample image 924A of the training dataset 922 may be a biomedical image. The biomedical image may be acquired in accordance with microscopy techniques or a histopathological image preparer, such as using an optical microscope, a confocal microscope, a fluorescence microscope, a phosphorescence microscope, an electron microscope, among others. The biomedical image may be, for example, a histological section with a hematoxylin and eosin (H & E) stain, hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain, among others. The biomedical image for the sample image 924A may be from a tissue section from a subject (e.g., human, animal, or plant) for performing histopathological surveys. The tissue sample may be from any part of the subject, such as a muscle tissue, a connective tissue, an epithelial tissue, or a nervous tissue in the case of a human or animal subject. The sample image 924A of the training dataset 922 may be another type of image.

Each sample image 924A of the training dataset 316 may include one or more regions of interest 926A and 926B (hereinafter generally referred as regions of interest 926). Each region of interest 926 may correspond to areas, sections, or boundaries within the sample image 924A that contain, encompass, or include conditions (e.g., features or objects within the image). For example, the sample image 924A may be a whole slide image (WSI) for digital pathology of a sample tissue, and the region of interest 926 may correspond to areas with lesions and tumors in the sample tissue. In some embodiments, the regions of interest 926 of the sample image 924A may correspond to different conditions. Each condition may define or specify a classification for the region of interest 926. For example, when the sample image 924A is a WSI of the sample tissue, the conditions may correspond to various histopathological characteristics, such as carcinoma tissue, benign epithelial tissue, stroma tissue, necrotic tissue, and adipose tissue, among others. In the depicted example, the first region of interest 926A may be associated with one condition (e.g., stroma tissue) and the second region of interest 926B may be associated with another condition (e.g., carcinoma tissue).

Furthermore, each sample image 924A may include or be associated with one or more annotations 928A and 928B (hereinafter generally referred as annotation 928). Each annotation 928 may indicate or label at a portion of one of the regions of interest 926 within the sample image 924A. Each annotation 928 may be at least partially manually prepared by a viewer examining the sample image 924A for conditions. For example, a pathologist examining the biomedical image within the sample image 924A may manually label the regions of interest 926 using the annotations 928 via a computing device. The annotations 928 may indicate, specify, or define an area, dimensions, or coordinates (e.g., using pixel coordinates) of the regions of interest 926 within the sample image 924A.

In some embodiments, each annotation 928 may identify or indicate different conditions associated with the region of interest 926. For example, when the sample image 924A is a WSI of the sample tissue, the annotation 928 may identify one of the various histopathological characteristics, such as carcinoma tissue, benign epithelial tissue, stroma tissue, necrotic tissue, and adipose tissue, among others. In the depicted example, the first annotation 928A may be associated with one condition (e.g., stroma tissue) corresponding to the first region of interest 926A. Furthermore, the second region of interest 926B may be associated with another condition (e.g., carcinoma tissue) corresponding to the second region of interest 926B.

In some embodiments, the annotations 928 may fully label or partially label (e.g., as depicted) the corresponding region of interest 926 within the sample image 924A. When fully labeled, the annotation 928 may cover or substantially cover (e.g., 90% or above) the corresponding region of interest 926 within the sample image 924A. Conversely, when partially labeled, the annotation 928 may define a portion of the region of interest 926 (less than fully) within the sample image 924A. In addition, the portion defined by each annotation 928 may be separated from at least one edge of the region of interest 926. The edge may define a perimeter or a boundary between two or more regions of interest 926.

When in runtime mode, the image preparer 912 may identify at least one input image 924B included in at least one input 930 from the imaging device 904. The imaging device 904 may acquire or generate at least one input image 924B of at least one sample. The sample may include any object or item, the input image 924B of which is acquired via the imaging device 904 (e.g., a camera). The sample may be, for example, a histological section with a hematoxylin and eosin (H & E) stain, hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain, among others. The sample may be from a tissue section from a subject (e.g., human, animal, or plant) for performing histopathological surveys. The tissue sample may be from any part of the subject, such as a muscle tissue, a connective tissue, an epithelial tissue, or a nervous tissue in the case of a human or animal subject, among others. The imaging device 904 may acquire the input image 924B of the sample in accordance with microscopy techniques, such as using an optical microscope, a confocal microscope, a fluorescence microscope, a phosphorescence microscope, an electron microscope, among others.

With the acquisition of the input image 924B, the imaging device 904 may provide, send, or transmit the input 930 including the input image 924B to the image classification system 902. The input image 924B may be similar to the sample image 924A, and may include one or more regions of interest 926 within the input image 924B. On the other hand, the input image 924B may lack any annotations 928 that is associated with the sample image 924A. In some embodiments, the imaging device 904 may acquire multiple input images 924B as a set to provide to the image classification system 902 via the input 930. The image preparer 912 may in turn receive the input 930 including the input image 924B from the imaging device 904.

Figure 9B:
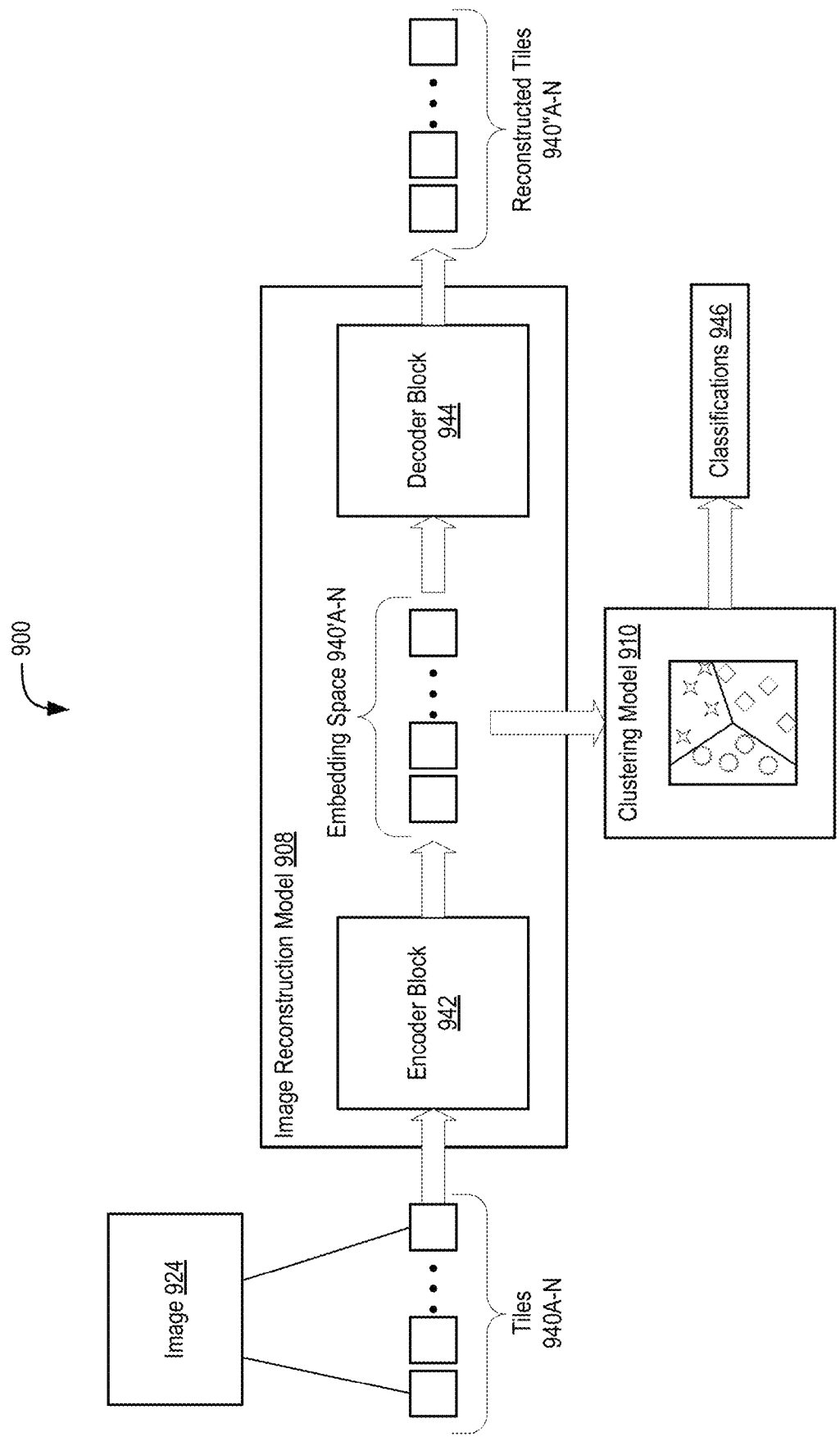
FIG. 9B depicts a block diagram of models in the system for clustering images using autoencoder models.

Referring now to FIG. 9B, depicted is a block diagram of the image reconstruction model 908 and the clustering model 910 in the context of the system 900. With the identification of the image 924 (generally referring to the sample image 924A or the input image 924B), the image preparer 912 may generate at least one set of tiles 940A-N (hereinafter generally referred as tiles 940). Each tile 940 may correspond to a portion of the image 924. Each tile 940 may have a dimension (or a resolution) as defined for input into the image reconstruction model 908. For example, the dimensions of each tile 940 may be 224×224 pixels. In some embodiments, the tile generator 3215 may partition or divide the image 924 into the set of tiles 940. In some embodiments, the image preparer 912 may apply to one or more magnification factors to generate the set of tiles 940. The magnification factors applied to the image 924 may range from 3× to 100×. In some embodiments, the image preparer 912 may generate the set of tiles 940 from the image 924 without overlap. In some embodiments, the image preparer 912 may generate the set of tiles 940 with an overlap of a set ratio. The ratio may range from 10% to 90% overlap between pairs of adjacent tiles 940.

In some embodiments, the image preparer 912 may identify a portion of the image 924 to generate set of tiles 940. When in training mode, the image preparer 912 may identify the portion of the sample image 924A corresponding to the region of interest 926 from the annotation 928. With the identification of the region of interest 926, the image preparer 912 may use the corresponding portion to generate the set of tiles 940. When in runtime mode, the image preparer 926 may identify the portion of the input image 924B to use in generating the set of tiles 940 by removing negative space. The identification of the negative space may be in accordance with a feature detection algorithm. For example, the negative space region of the input image 924B may lack any portion of the micro-anatomical sample or specimen. The negative space within the input image 924B may correspond to the region of the image 924B that is null or white. The remaining portion of the input image 924B may correspond to the region of interest 926. Using the remaining portion, the image preparer 912 may generate the set of tiles 940.

In some embodiments, the image preparer 912 may select or identify a subset of tiles 940 from the generated set to feed to the image reconstruction model 908. In some embodiments, the image preparer 912 may first generate the set of tiles 940 from the image 924 and then remove a subset of tiles 940 not corresponding to any regions of interest 926 within the image 924. In some embodiments, the image preparer 912 may perform one or more quality control measures in selecting the subset of tiles 940 to feed. The quality control measures may include noise detection, blur detection, and brightness detection, among others. For example, the image preparer 912 may remove a tile 940 from the set when the tile 940 is determined to have an amount of noise greater than a noise threshold value, an amount of blur greater than a blur tolerance value, or a brightness lower than a brightness threshold value. Conversely, the image preparer 912 may maintain a tile 940 in the set when the tile 940 is determined to have an amount of noise lower than the noise threshold value, an amount of blur lower than the blur tolerance value, or a brightness higher than the brightness threshold value.

The model trainer 914 executing on the image classification system 902 may initiate, establish, and maintain the image reconstruction model 908. The initiation and establishment of the image reconstruction model 908 may be under training mode and may use the sample images 924A of the training dataset 922 maintained on the database 920. As depicted, the image reconstruction model 908 may include at least one encoder block 942 (sometimes referred herein as a residual network) and at least one decoder block 944 (sometimes referred herein as a decoder network). In some embodiments, the training of the encoder block 942 may be performed separately from the decoder block 944, or vice-versa. For example, the model trainer 914 may using one training dataset 922 to train the encoder block 942. Once the encoder block 942 is trained, the model trainer 914 may train both the encoder block 942 and the decoder block 944 using a different training dataset 922 in the same iteration. In some embodiments, the training of the encoder block 942 and the decoder block 944 may be performed in conjunction. For example, the model trainer 914 may use the same training dataset 922 to train the encoder block 942 and the decoder block 944 in the same epoch or iteration. The image reconstruction model 908 may be an instance of the architecture detailed herein in conjunction with FIGS. 3 and 7 in Sections A and B.

Each of the encoder block 942 and the decoder block 944 of the image reconstruction model 908 may have at least one input and at least one output. The input to the image reconstruction model 908 may correspond to the input of the encoder block 942. The input may include the set of tiles 940 (or corresponding feature space representations) to be processed one-by-one by encoder block 942. The output of the encoder block 942 may include a corresponding set of embedding representations 940'A-N (hereinafter generally referred to as embedding space 940') corresponding to the set of tiles 940. The set of embedding representations 940' may be collectively referred to as an embedding space. Each embedding representation 940' may be of a lower dimension than the corresponding input tile 940. The output of the encoder block 942 may be feed into the input of the decoder block 944. The input of the decoder block 944 may thus include the embedding space 940'. The output of the decoder block 944 may include a set of reconstructed tiles 940" (or a corresponding feature space representation). Each reconstructed tile 940" may be of a higher dimension than the corresponding embedding representation 940', and may be of the same dimension as the original input tile 940.

In each of the encoder block 942 and the decoder block 944, the input and the output may be related to each other may include a set of weights to be applied to the input to generate the output. In some embodiments, the set of weights may be arranged in one or more transform layers. Each layer may specify a combination or a sequence of application of the weights. The layers may be arranged in accordance with the machine learning algorithm or model for the image reconstruction model 308, for example, as detailed herein in conjunction with FIGS. 9C-9F.

The model applier 916 executing on the image classification system 902 may apply the image reconstruction model 908 to the set of tiles 940 generated from the image 924 (e.g., the sample image 924A or the input image 924B). In some embodiments, the set of tiles 940 to be applied may be from multiple images 924. In applying, the model applier 916 may feed each individual tile 940 to the image reconstruction model 908. The model applier 916 may apply the weights of the encoder block 942 to each tile 940 to generate a corresponding embedding representation 940'. The model applier 916 may identify the set of embedding representations 940' outputted by the encoder block 942. The model applier 916 may apply the weights of the decoder block 944 to each embedding representation 940' to generate a corresponding reconstructed tile 940". The model applier 916 may also apply the set of embedding representations 940' to the clustering model 910 to output a corresponding set of classifications 946. Each classification 946 may identify an condition for each tile 940.

Figure 9C:
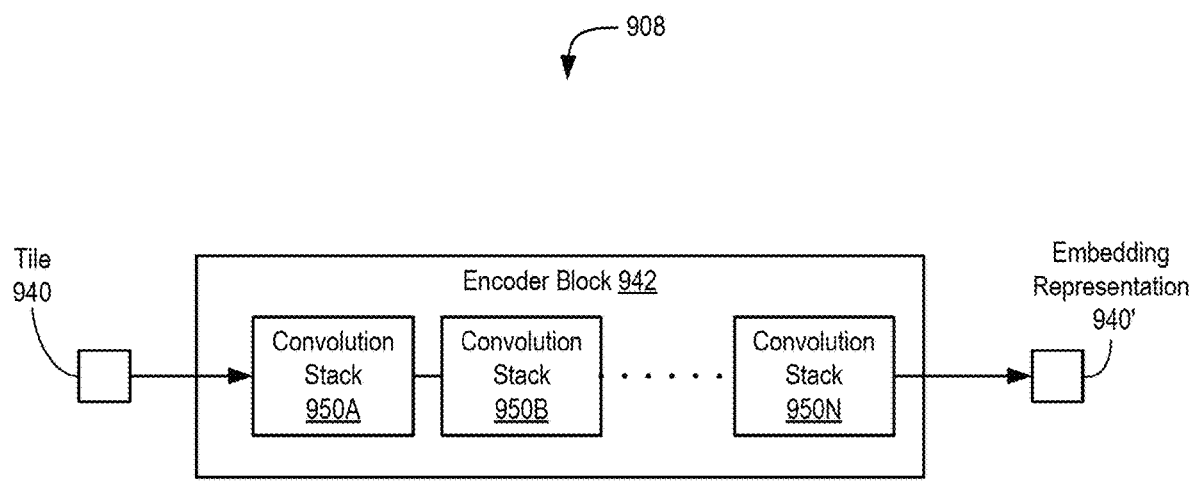
FIG. 9C depicts a block diagram of an encoder block of an image reconstruction model in the system for clustering images.

Referring now to FIG. 9C, depicted is a block diagram of the encoder block 942 of the image reconstruction model 908 in the system 900 for clustering images. The encoder block 942 of the image reconstruction model 908 may include at least one input and at least one output. The input can include each tile 940. The output can include an embedding representation 940' (sometimes herein referred as a feature map) corresponding to the tile 940. The encoder block 942 can have a set of convolution stacks 950A-N (hereinafter generally referred to as convolution stacks 950). The input and the output of the encoder block 942 may be related via the weights as defined in the set of convolution stacks 950. The set of convolution stacks 950 can be arranged in series (e.g., as depicted) or parallel configuration, or in any combination. In a series configuration, the input of one convolution stacks 950 may include the output of the previous convolution stacks 950 (e.g., as depicted). In parallel configuration, the input of one convolution stacks 950 may include the input of the entire encoder block 942.

Figure 9D:
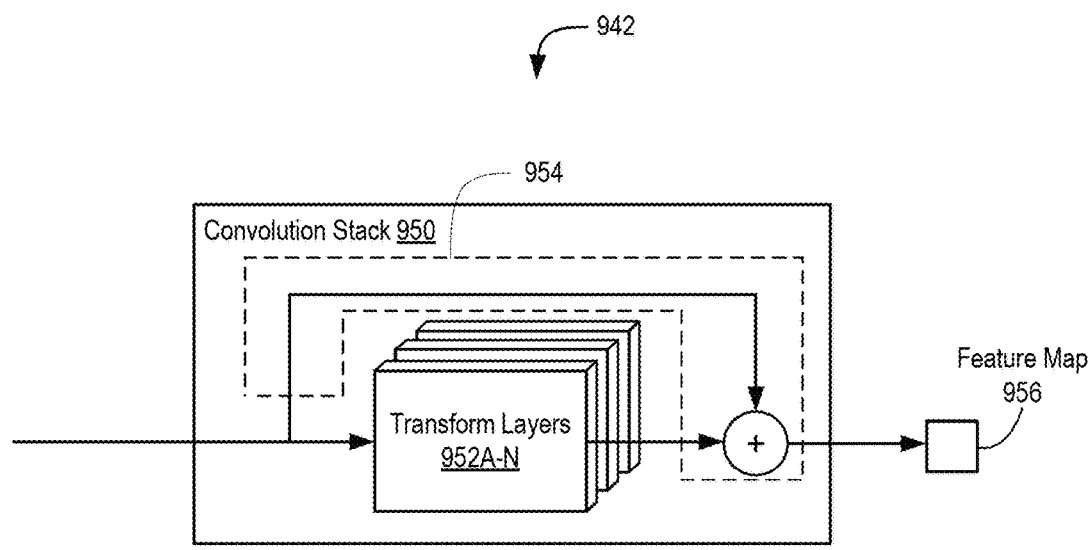
FIG. 9D depicts a block diagram of a convolution stack in an encoder block of an image reconstruction model in the system for clustering images.

Referring now to FIG. 9D, depicted is a block diagram of a convolution stack 950 in the encoder block 942 of the image reconstruction model 908 in the system 900. Each convolution stack 950 in the convolution stack 950 can have a set of transform layers 952A-N (hereinafter generally referred to as transform layers 952). The set of transform layers 952 can include one or more weights to modify or otherwise process the input to produce or generate an output feature map 956. The input may include one of the tiles 940 when the convolution stack 950 is the first in the encoder block 942. The input may include a resultant feature map 956 when the convolution stack 950 is not the first in the encoder block 942. The output feature map 956 may correspond to one of the embedding representations 940'. The set of transform layers 952 can be arranged in series, with an output of one transform layer 952 fed as an input to a succeeding transform layer 952. Each transform layer 952 may have a non-linear input-to-output characteristic. In some embodiments, the set of transform layers 952 may be a convolutional neural network (CNN), including a convolutional layer, a normalization layer, and an activation layer (e.g., a rectified linear unit (ReLU)), among others.

In some embodiments, at least one of the convolution stacks 950 in the encoder block 942 may include at least one skip aggregator operator 954. The skip aggregator operator 954 can combine the output feature map 956 from the set of transform layers 952 and the original input to generate an output feature map 956 for the convolution stack 950. The combination may include addition, concatenation, or a weighted summation, among others. In some embodiments, the skip aggregator operator 954 can concatenate the output from the set of transform layers 952 with the input into the convolution stack 950 to generate the output feature map 956.

Figure 9E:
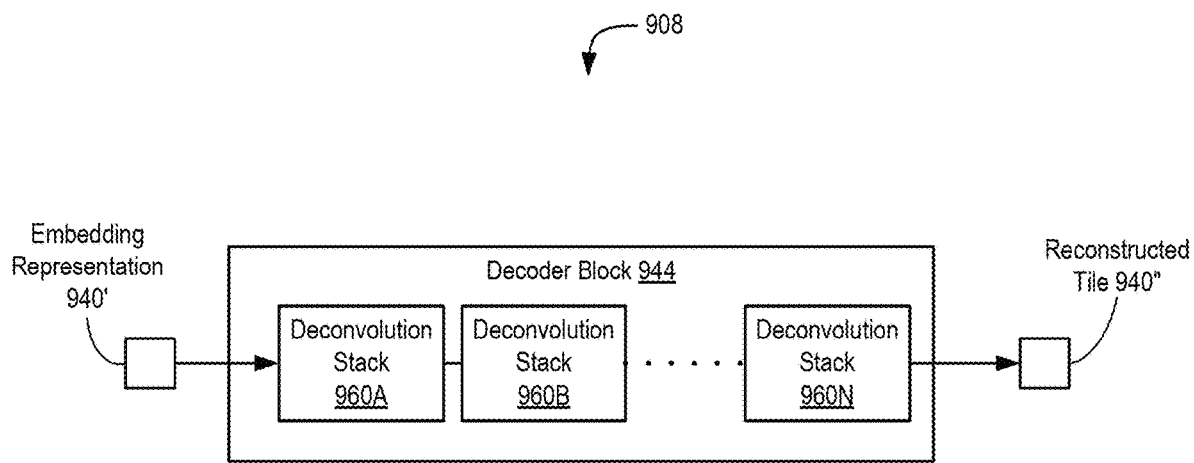
FIG. 9E depicts a block diagram of a decoder block of an image reconstruction model in the system for clustering images.

Referring now to FIG. 9E, depicted is a block diagram of a decoder block 944 of the image reconstruction model 908 in the system 900. The decoder block 944 of the image reconstruction model 908 may include at least one input and at least one output. The input can include one of the embedding representations 940'. The output can include a reconstructed tile 940" corresponding to the input embedding representation 940'. The decoder block 944 can have a set of deconvolution stacks 960A-N (hereinafter generally referred to as deconvolution stacks 960). The input and the output of the decoder block 944 may be related via the weights as defined in the set of deconvolution stacks 960. The set of deconvolution stacks 960 can be arranged in series (e.g., as depicted) or parallel configuration, or in any combination. In a series configuration, the input of one deconvolution stacks 960 may include the output of the previous deconvolution stacks 960 (e.g., as depicted). In parallel configuration, the input of one deconvolution stacks 960 may include the input of the entire decoder block 944.

Figure 9F:
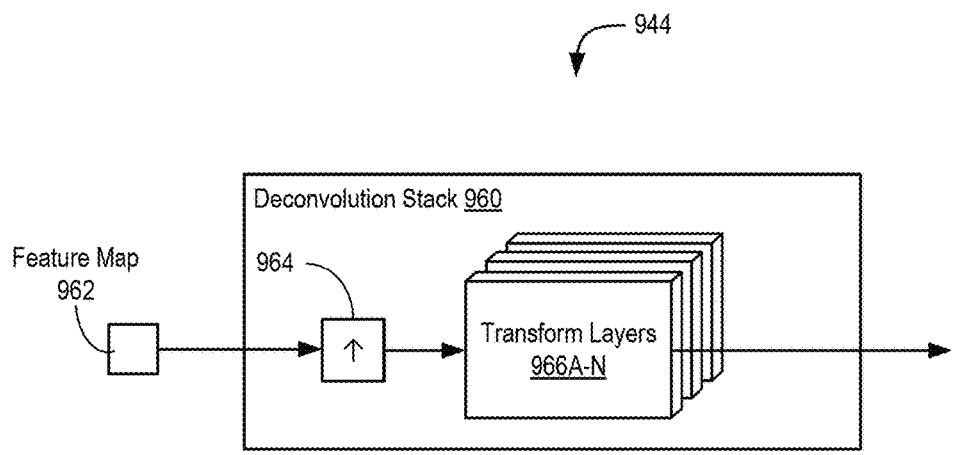
FIG. 9F depicts a block diagram of a deconvolution stack in an encoder block of an image reconstruction model in the system for clustering images

Referring now to FIG. 9F, depicted is a block diagram of a deconvolution stack 960 in the decoder block 944 of the image reconstruction model 908 in the system 900. Each deconvolution stack 960 in the deconvolution stack 960 can have at least one up-sampler 964 and a set of transform layers 966A-N (hereinafter generally referred to as transform layers 966). The up-sampler 964 and the set of transform layers 966 can include one or more weights to modify or otherwise process the input to produce or generate an output reconstructed tile 940". The input may include one of the embedding representations 940' when the deconvolution stack 960 is the first in the decoder block 944. The input may include a resultant feature map 962 from a previous deconvolution stack 960 when the deconvolution stack 960 is not the first in the decoder block 944.

The up-sampler 964 may increase the image resolution of the feature map 962 to increase a dimension (or resolution) to fit the set of transform layers 966. In some implementations, the up-sampler 964 can apply an up-sampling operation to increase the dimension of the feature map 962. The up-sampling operation may include, for example, expansion and an interpolation filter, among others. In performing the up-sampling operation, the up-sampler 964 may insert null (or default) values into the feature map 962 to expand the dimension. The insertion or null values may separate the pre-existing values. The up-sampler 964 may apply a filter (e.g., a low-pass frequency filter or another smoothing operation) to the expanded feature map. With the application, the up-sampler 964 may feed the resultant feature map 962 into the transform layers 966.

The set of transform layers 966 can be arranged in series, with an output of one transform layer 966 fed as an input to a succeeding transform layer 966. Each transform layer 966 may have a non-linear input-to-output characteristic. In some embodiments, the set of transform layers 966 may be a convolutional neural network (CNN), including a convolutional layer, a normalization layer, and an activation layer (e.g., a rectified linear unit (ReLU)), among others.

Figure 9G:
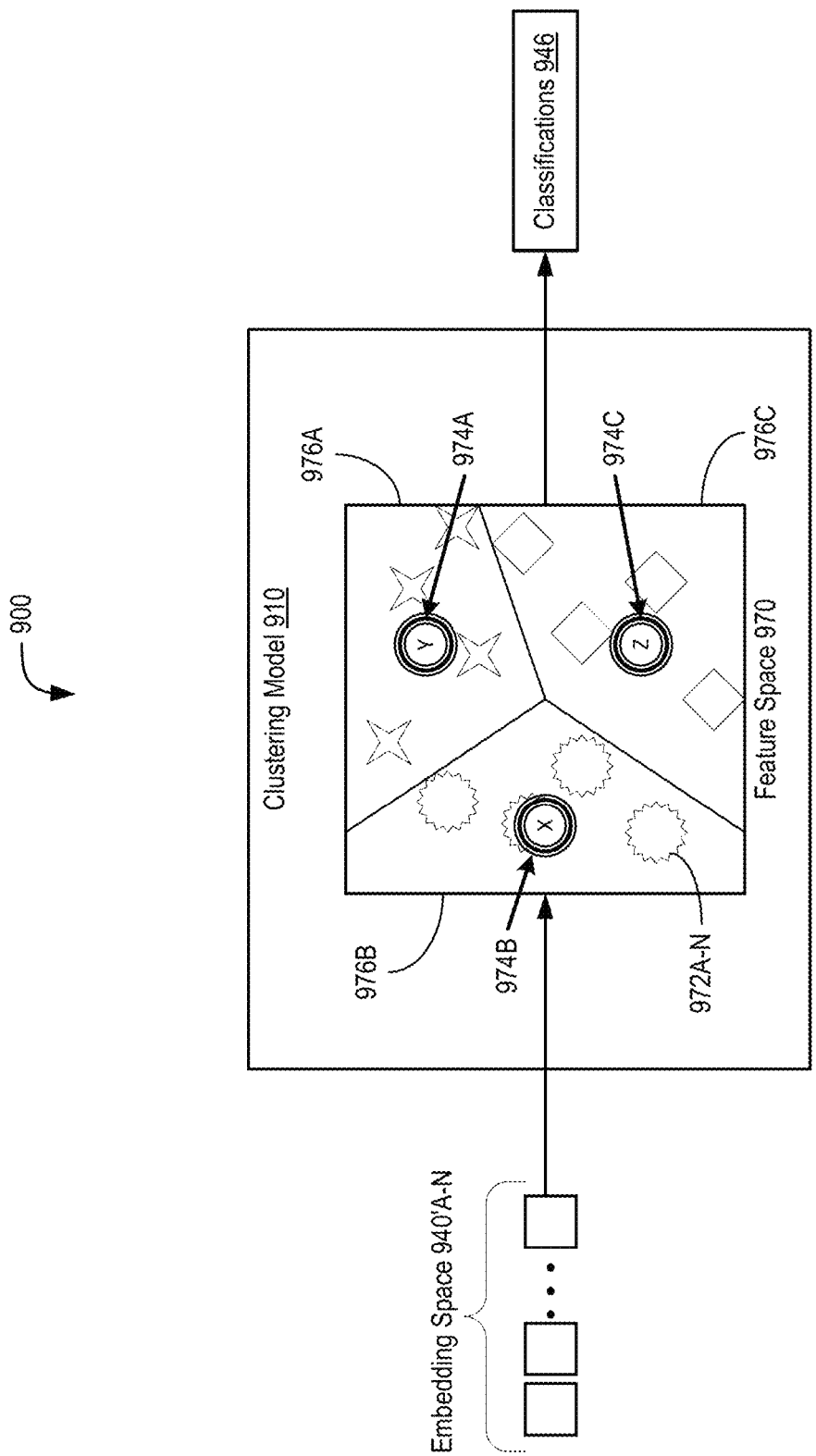
FIG. 9G depicts a block diagram of a clustering model in the system for clustering images.

Referring now to FIG. 9G, depicted is a block diagram of the clustering model 910 in the system 900. The clustering model 910 may include or define at least one feature space 970 (sometimes referred herein as a data space). The feature space 970 may be a n-dimensional representation within which each of the embedding representations 940' can reside as a corresponding set of points 972A-N (generally referred herein as points 972). For example, each embedding representation 940' may be 1×512 in dimension. In this example, the feature space 970 may be 512-dimensional, and the points 972 may reside somewhere within the feature space 970 based on the values of the corresponding embedding representation 940'.

The clustering model 910 may include a set of inputs and a set of outputs. The inputs may include the set of embedding representations 940' generated by the encoder block 942 of the image reconstruction model 908. The outputs may include a set of classifications 946 for the set of tiles 940 corresponding to the set of embedding representations 940'. The classification 946 may identify, indicate, or correspond to which condition is present the respective tile 940 (or embedding representation 940'). For example, the classification 946 may indicate that the tile 940 corresponding to the input embedding representation 940' is correlated with a lesion in a tissue sample from which the image 924 is acquired. The inputs and outputs of the clustering model 910 may be related via the feature space 970.

The feature space 970 of the clustering model 910 may define or include a set of centroids 974A-N (generally referred hereinafter centroids 974) and a set of partitions 976A-N (generally referred herein after as partitions 976). Each centroid 974 may define a corresponding partition 976 within the feature space 970. Each partition 976 may correspond to a portion of the feature space 970 most proximate (e.g., in terms of Euclidean distance or L-norm distance) to the centroid 974 defining the respective partition 976.

The model trainer 914 may initialize, establish, or maintain the clustering model 910. In initializing, the model trainer 914 may set or assign a set of points within the features space 760 for the corresponding set of centroids 974. The assignment of the points in initializing may occur prior the training of the image reconstruction model 908. The set of points for the centroids 974 may be at random points within the features space 750 (e.g., using a pseudo-random number generator). The set of points for the centroids 974 may be at predefined points within the feature space 970 (e.g., a defined distances from one another). In some embodiments, the model trainer 914 may identify a number of conditions for the regions of interest 926 within the image 924 for the number of centroids 974. In some embodiments, the model trainer 914 may use a predefined number (e.g., as configured by an administrator of the system 900) for the number of centroids 974. Using the number, the model trainer 914 may create the set of points within the feature space 760 for the set of centroids 974.

Based on the assignment of the set of points for the centroids 974 in the initialization, the model trainer 914 may also identify or determine the set of corresponding partitions 976 within the feature space 970. For each centroid 974, the model trainer 914 may identify the portion of the feature space 970 most proximate to the centroid 974. The model trainer 914 may define the identified portion of the feature space 970 about the centroid 974 as the respective partition 976. In addition, the model trainer 914 may assign or classify each tile 940 using the initial assignment of the set of centroids 974.

The cluster analyzer 918 executing on the image classification system 902 may apply the set of embedding representations 940' to the clustering model 910 to identify the corresponding set of classifications 946. In applying, the cluster analyzer 918 may place, insert, or otherwise include each of the embedding representations 940' into the feature space 970 defined by the clustering model 910. For each embedding representation 940', the cluster analyzer 918 may determine or identify a corresponding point 972 within the feature space 970. The cluster analyzer 918 may calculate or determine a distance metric (e.g., a Euclidean distance or an L-norm distance) between the identified point 972 and each of the centroids 974. Using the calculated distance metrics, the cluster analyzer 918 may identify the centroid 974 to which the point 972 is most proximate (e.g., in terms of Euclidean distance or L-norm distance).

With the identification of the centroid 974, the cluster analyzer 918 may determine, assign, or otherwise classify the tile 940 that corresponds to the embedding representation 940' as the condition that corresponds to the centroid 974. In some embodiments, the cluster analyzer 918 may identify the partition 976 under which the point 972 corresponding to the embedding representation 940' resides within the feature space 970. The cluster analyzer 918 may use the partition 976 to identify the condition for the tile 940 that corresponds to the embedding representation 940'. The cluster analyzer 918 may repeat these operations to identify the classifications 946 over the set of embedding representations 940'.

Based on the classifications, the model trainer 914 may update, adjust, or otherwise modify the feature space 970 of the clustering model 910. The modification of the features space 970 of the clustering model 910 may be performed under training mode. Using the points 972 within the feature space 970, the model trainer 914 may modify the set of centroids 974 defining the set of partitions 976 for the conditions. For each classification, the model trainer 914 may identify a set of points 972 residing within the partition 976 for the classification. Using the identified set of points 972, the model trainer 914 may calculate or determine a new centroid 974. For example, the model trainer 914 may calculate an average value in each dimension of the feature space 970 as the new centroid 974. Once the new set of centroids 974 are determined, the model trainer 914 may determine or identify a new set of partitions 976 within the feature space 970 in a similar manner as detailed above.

The model trainer 914 may calculate or determine a clustering error metric also based on the classifications. The clustering error metric may indicate or represent a degree of discrepancy of the tiles 940 to the proper classification within the feature space 970 of the clustering model 910. The clustering error metric may be calculated in accordance with any number of loss functions, such as mean squared error (MSE), a quadratic loss, and a cross-entropy loss, among others. To determine the clustering error metric, the model trainer 914 may identify the set of centroids 974 in the clustering model 910 prior to the modification of the feature space 970. For each centroid 974, the model trainer 914 may identify the set of points 972 that are identified as most proximate to the centroid 974. For each point 972, the model trainer 914 may calculate or determine a distance metric (e.g., Euclidean distance or L-norm distance) between the point and the centroid 974. The calculation of the distance metrics over all the centroids 974 and the points 972 corresponding to the set of embedding representations 940'. Using the distance metrics over all the embedding representations 940', the model trainer 914 may calculate or determine the clustering error metric. For example, the model trainer 914 may calculate an average value or a weighted summation over all the distance metrics as the clustering error metric.

The model trainer 914 may calculate or determine a reconstruction error metric between the set of tiles 940 and the corresponding set of reconstructed tiles 940". The reconstruction error metric may indicate or represent a degree of deviation between an original tile 940 and a corresponding reconstructed tile 940" generated by the image reconstruction model 908. The reconstruction error metric may be calculated in accordance with any number of loss functions, such as mean squared error (MSE), a quadratic loss, and a cross-entropy loss, among others. To determine the reconstruction error metric, the model trainer 914 may identify a tile 940 and a reconstructed tile 940" that corresponds to the tile 940. The model trainer 914 may compare the tile 940 with the reconstructed tile 940" to calculate or determine a discrepancy metric. The discrepancy metric may indicate or represent a deviation between the original tile 940 and the reconstructed tile 940". In some embodiments, the model trainer 914 may compare a color value (e.g., red-green-blue or grayscale) of the tile 940 and a color value of the reconstructed tile 940" pixel-by-pixel to determine the discrepancy metric. The calculation or the determination of the discrepancy values may be repeated over each tile 940 or reconstructed tile 940". Using the discrepancy metrics over all the tiles 940 and reconstructed tiles 940", the model trainer 914 may calculate or determine the reconstruction error metric. For example, the model trainer 914 may calculate an average value or a weighted summation over all the discrepancy metrics as the reconstruction error metric.

In accordance with the clustering error metric and the reconstruction error metric, the model trainer 914 may modify, change, or otherwise update one or more of the weights in the encoder block 942 or the decoder block 944 of image reconstruction model 908. In some embodiments, the model trainer 914 may update the set of transform layers in the image reconstruction model 908. The updating of weights may be in accordance with an optimization function (or an objective function) for the image reconstruction model 908. The optimization function may define one or more rates or parameters at which the weights of the image reconstruction model 908 are to be updated. For example, the model trainer 914 may use the optimization function (e.g., Adam optimization) with a set learning rate (e.g., ranging from $10^{-6}$ to $10^{-1}$), a momentum (e.g., ranging from 0.1 to 1), and a weigh decay (e.g., ranging from $10^{-6}$ to $10^{-2}$) for a number of iterations (e.g., ranging from 10 to 200) in training the image reconstruction model 908.

In some embodiments, the model trainer 914 may calculate or determine a combined error metric based on the clustering error metric and the reconstruction error metric. The combined error metric may be a weighted summation of the clustering error metric and the reconstruction error metric. In determining the combined error metric, the model trainer 914 may apply a weight (of factor) to the clustering error metric and a weight (or factor) to the reconstruction error metric. With the combined error metric, the model trainer 914 may update one or more of the weights in the encoder block 942 or the decoder block 944 of the image reconstruction model 908. The updating of the weights in accordance with the optimization function using the combined error metric may be similar as discussed above.

The model trainer 914 may repeat the training of the image reconstruction model 908 using the sample images 924A of the training dataset 922 maintained on the database 920, and re-apply the tiles 940 to repeat the functionalities as discussed above. In some embodiments, the model trainer 914 may continue training the image reconstruction model 908 by reapplying the tiles 940 for a predefined number of iterations (e.g., as specified by the administrator of the system 900). With each repeated training, the tiles 940 may be repeatedly applied to the image reconstruction model 908. With the re-application of the tiles 940, the classifications 946 at least one of the tiles 940 into the conditions may change relative to the previous assignment. In some embodiments, the model trainer 914 may train the image reconstruction model 908 and the clustering model 910 in accordance with the following pseudo-code:
1. Centroids are randomly initialized in feature space.
2. All samples (tiles) are randomly assigned to a centroid
3. Training begins:
   a. All tiles are pushed thru the model and their embedding ($Z_i$) is saved
   b. Distance between $Z_i$ and associated centroid (clustering error) is measured
   c. Reconstruction error between output and input is measured
   d. Combined error is back propagated
   e. Saved $Z_i$ is used to update centroid locations by averaging all samples in each cluster
   f. Repeat from step (a). On the repeat $Z_i$ will have new values because model was updated in step (d)

In some embodiments, the model trainer 914 may determine whether to continue training the image reconstruction model 908 based on whether the clustering model 910 is at a convergence state. To determine whether the clustering model 910 is at convergence, the model trainer 914 may identify the set of centroids 974 prior to the modification of the feature space 970. The model trainer 914 may also identify the new set of centroids 974 from the modification of the feature space 970 of the clustering model 910. For each centroid 974 of the previous set, the model trainer 914 may identify a corresponding centroid 974 of the new set. Both centroids 974 may be for the same condition.

For each pair of centroids 974, the model trainer 914 may calculate or determine a movement metric between the two points corresponding to the centroids 974 within the feature space 970. The movement metric may indicate a degree to which the centroids 974 moved within the feature space 970. The model trainer 914 may also determine a combined movement metric using the movement metrics calculated over each pair of centroids 974. The model trainer 914 may compare the combined movement metric to a threshold value. The threshold value may demarcate a value for the combined movement metric at which the clustering model 910 is deemed to be at convergence.

When the combined movement metric is less than or equal to the threshold value, the model trainer 914 may determine that the clustering model 910 is at convergence. The model trainer 914 may also terminate the training of the image reconstruction model 908. When the combined movement metric is greater than the threshold value, the model trainer 914 may determine that the clustering model 910 is not at convergence. The model trainer 914 may continue the training of the image reconstruction model 908, and re-apply the tiles 940 from the sample images 924A as discussed above.

Under runtime mode, the model applier 916 may send, transmit, or provide at least one output 932 for presentation to the display 906. The output 932 may include the image 924 (e.g., sample image 924A or the input image 924B), the set of tiles 940, and the classification 946 for each of the tiles 940. The display 906 may be part of the image classification system 902 or on another computing device that may be communicatively coupled to the image classification system 902. The display 906 may present or render the output 932 upon receipt from the model applier 916. For example, the display 906 may render a graphical user interface that shows the set of tiles 940 from the image 924. For each tile 940, the graphical user interface rendered on the display 906 may show the condition associated with each of the tiles 940 as determined using the image reconstruction model 908 and the clustering model 910.

Figure 10A:
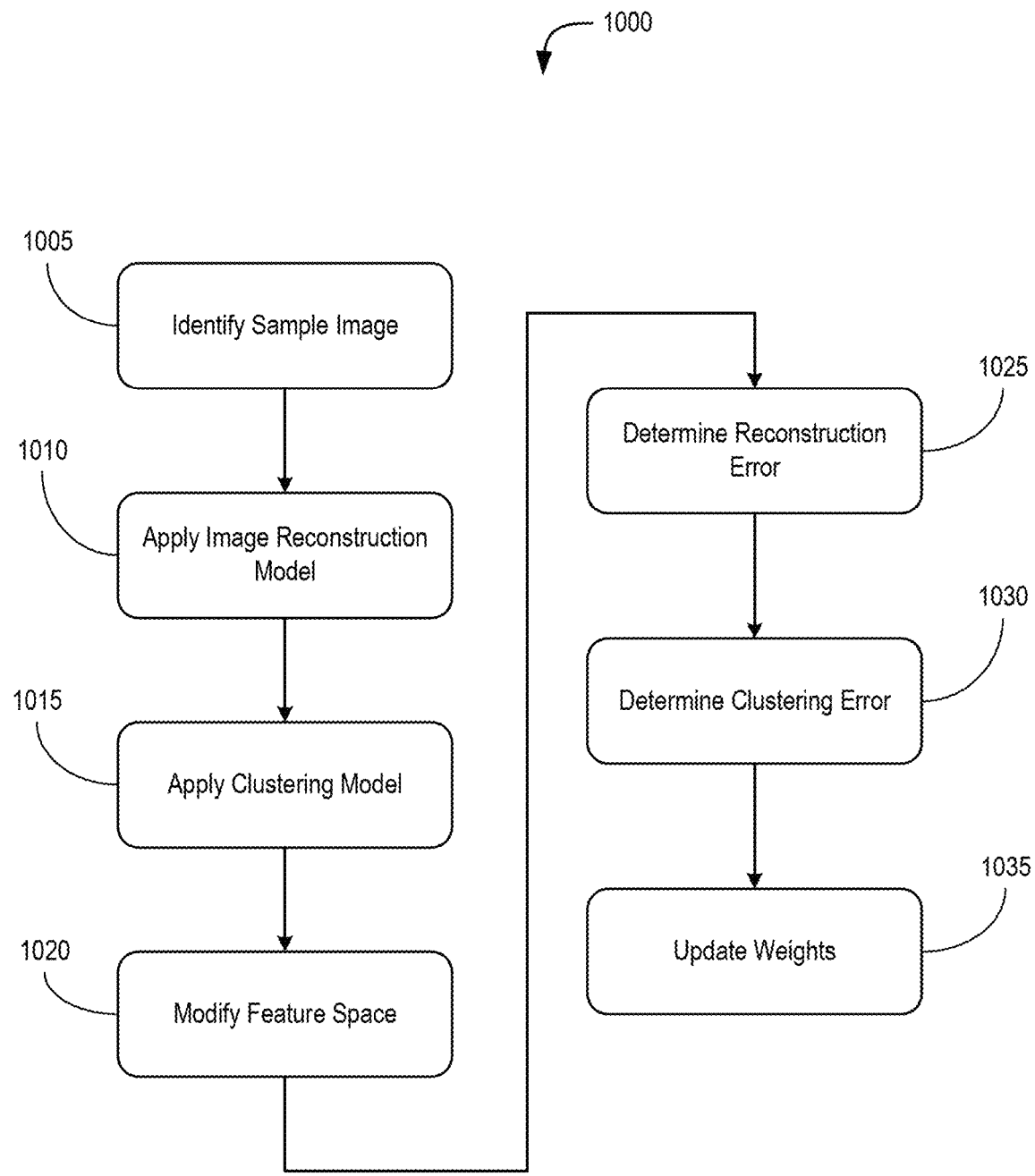
FIG. 10A depicts a flow diagram of a method of training autoencoder models to cluster images.

Referring now to FIG. 10A, depicted is a flow diagram of a method 1000 of training autoencoder models to cluster images. The method 1000 may be implemented or performed by any of the components described herein in conjunction with FIGS. 9A-9G or FIG. 11. In overview, a computing system (e.g., the image reconstruction system 902) may identify a sample image (e.g., the sample image 924A) (1005). The computing system may apply an image reconstruction model (e.g., the image reconstruction model 908) to the sample image (1010). The computing system may apply a clustering model (e.g., the clustering model 910) (1015). The computing system may modify a feature space (e.g., the feature space 970) of the clustering model (1020). The computing system may determine a reconstruction error (1025). The computing system may determine a clustering error (1030). The computing system may update weights of the image reconstruction model 908 using the reconstruction error and the clustering error (1035).

Figure 10B:
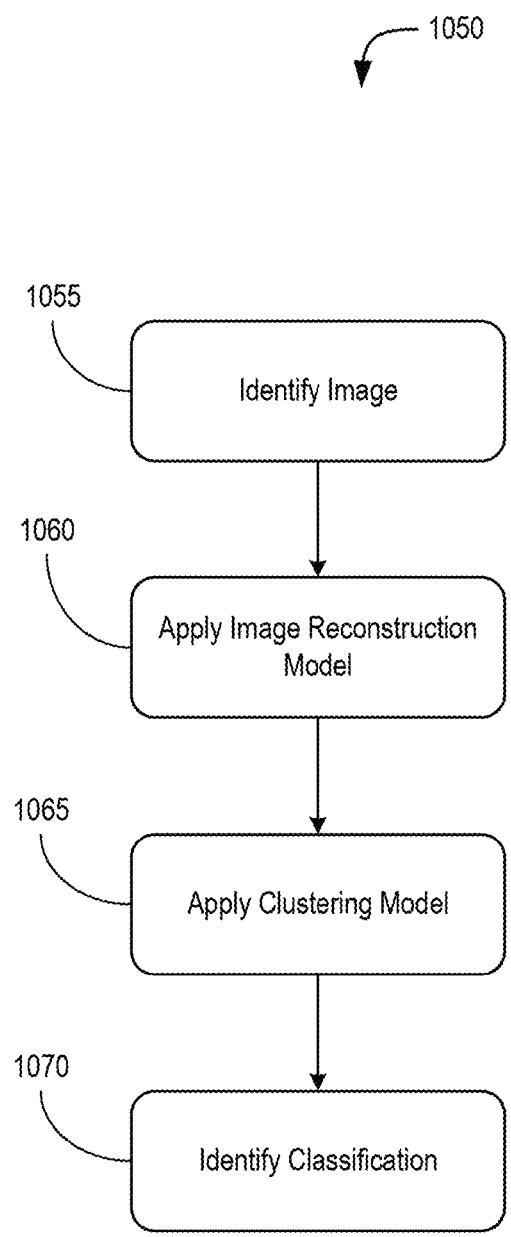
FIG. 10B depicts a flow diagram of a method of clustering images using autoencoder models.

Referring now to FIG. 10B, depicted is a flow diagram of a method 1050 of clustering images using autoencoder models. The method 1050 may be implemented or performed by any of the components described herein in conjunction with FIGS. 9A-9G or FIG. 11. In overview, a computing system (e.g., the image reconstruction system 902) may identify a image (e.g., the input image 924B) (1055). The computing system may apply an image reconstruction model (e.g., the image reconstruction model 908) to the image (1060). The computing system may apply a clustering model (e.g., the clustering model 910) (1065). The computing system may identify a classification from the clustering model (1070).

D. Computing and Network Environment

Figure 11:
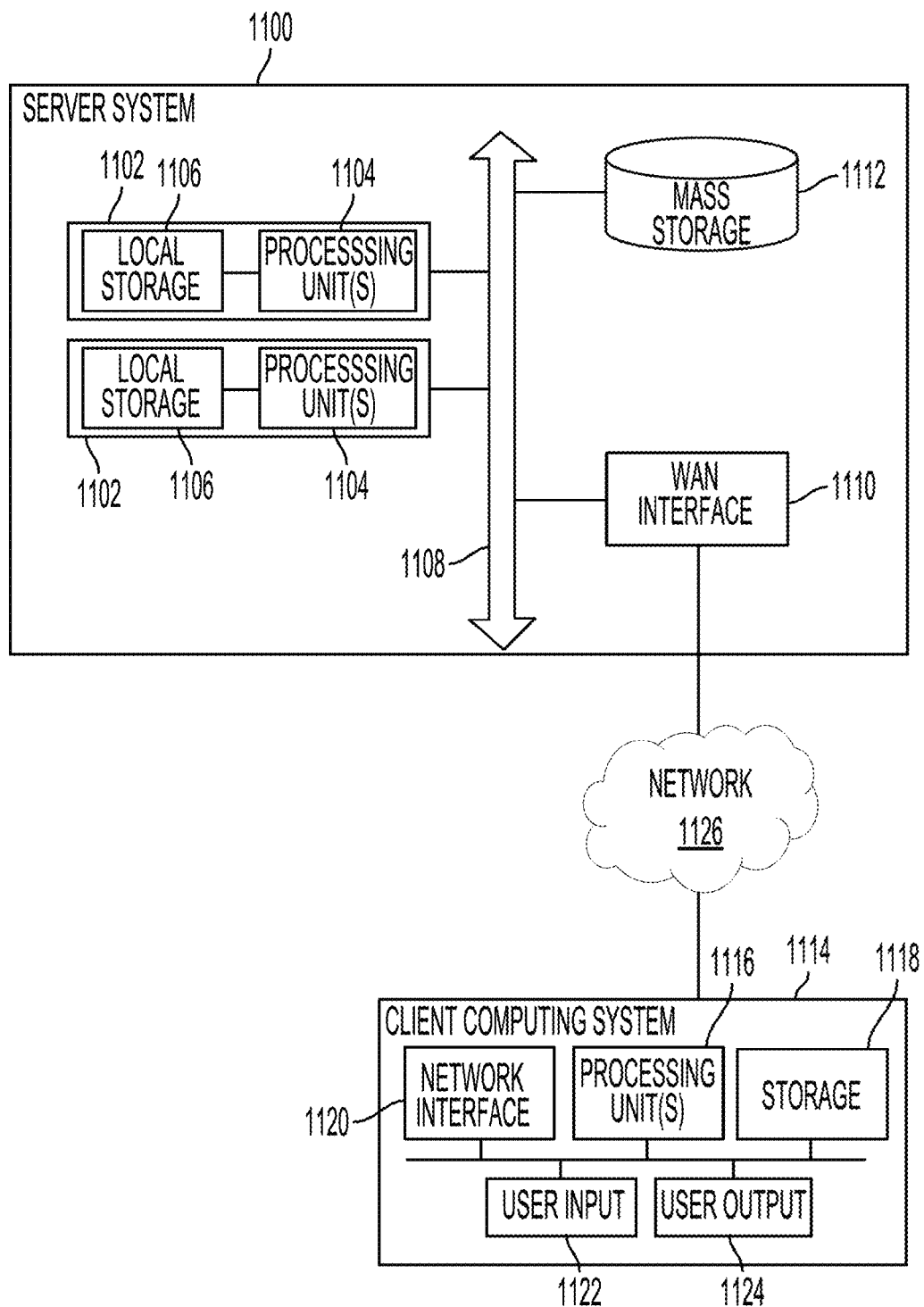
FIG. 11 depicts a block diagram of a server system and a client computer system in accordance with an illustrative embodiment.

Various operations described herein can be implemented on computer systems. FIG. 11 shows a simplified block diagram of a representative server system 1100, client computer system 1114, and network 1126 usable to implement certain embodiments of the present disclosure. In various embodiments, server system 1100 or similar systems can implement services or servers described herein or portions thereof. Client computer system 1114 or similar systems can implement clients described herein. The system 900 described herein can be similar to the server system 1100. Server system 1100 can have a modular design that incorporates a number of modules 1102 (e.g., blades in a blade server embodiment); while two modules 1102 are shown, any number can be provided. Each module 1102 can include processing unit(s) 1104 and local storage 1106.

Processing unit(s) 1104 can include a single processor, which can have one or more cores, or multiple processors. In some embodiments, processing unit(s) 1104 can include a general-purpose primary processor as well as one or more special-purpose co-processors such as graphics processors, digital signal processors, or the like. In some embodiments, some or all processing units 1104 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1104 can execute instructions stored in local storage 1106. Any type of processors in any combination can be included in processing unit(s) 1104.

Local storage 1106 can include volatile storage media (e.g., DRAM, SRAM, SDRAM, or the like) and/or non-volatile storage media (e.g., magnetic or optical disk, flash memory, or the like). Storage media incorporated in local storage 1106 can be fixed, removable or upgradeable as desired. Local storage 1106 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1104 need at runtime. The ROM can store static data and instructions that are needed by processing unit(s) 1104. The permanent storage device can be a non-volatile read-and-write memory device that can store instructions and data even when module 1102 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 1106 can store one or more software programs to be executed by processing unit(s) 1104, such as an operating system and/or programs implementing various server functions such as functions of the system 900 of FIG. 9 or any other system described herein, or any other server(s) associated with system 900 or any other system described herein.

"Software" refers generally to sequences of instructions that, when executed by processing unit(s) 1104 cause server system 1100 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 1104. Software can be implemented as a single program or a collection of separate programs or program modules that interact as desired. From local storage 1106 (or non-local storage described below), processing unit(s) 1104 can retrieve program instructions to execute and data to process in order to execute various operations described above.

In some server systems 1100, multiple modules 1102 can be interconnected via a bus or other interconnect 1108, forming a local area network that supports communication between modules 1102 and other components of server system 1100. Interconnect 1108 can be implemented using various technologies including server racks, hubs, routers, etc.

A wide area network (WAN) interface 1110 can provide data communication capability between the local area network (interconnect 1108) and the network 1126, such as the Internet. Technologies can be used, including wired (e.g., Ethernet, IEEE 802.3 standards) and/or wireless technologies (e.g., Wi-Fi, IEEE 802.11 standards).

In some embodiments, local storage 1106 is intended to provide working memory for processing unit(s) 1104, providing fast access to programs and/or data to be processed while reducing traffic on interconnect 1108. Storage for larger quantities of data can be provided on the local area network by one or more mass storage subsystems 1112 that can be connected to interconnect 1108. Mass storage subsystem 1112 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1112. In some embodiments, additional data storage resources may be accessible via WAN interface 1110 (potentially with increased latency).

Server system 1100 can operate in response to requests received via WAN interface 1110. For example, one of modules 1102 can implement a supervisory function and assign discrete tasks to other modules 1102 in response to received requests. Work allocation techniques can be used. As requests are processed, results can be returned to the requester via WAN interface 1110. Such operation can generally be automated. Further, in some embodiments, WAN interface 1110 can connect multiple server systems 1100 to each other, providing scalable systems capable of managing high volumes of activity. Other techniques for managing server systems and server farms (collections of server systems that cooperate) can be used, including dynamic resource allocation and reallocation.

Server system 1100 can interact with various user-owned or user-operated devices via a wide-area network such as the Internet. An example of a user-operated device is shown in FIG. 11 as client computing system 1114. Client computing system 1114 can be implemented, for example, as a consumer device such as a smartphone, other mobile phone, tablet computer, wearable computing device (e.g., smart watch, eyeglasses), desktop computer, laptop computer, and so on.

For example, client computing system 1114 can communicate via WAN interface 1110. Client computing system 1114 can include computer components such as processing unit(s) 1116, storage device 1118, network interface 1120, user input device 1122, and user output device 1124. Client computing system 1114 can be a computing device implemented in a variety of form factors, such as a desktop computer, laptop computer, tablet computer, smartphone, other mobile computing device, wearable computing device, or the like.

Processor 1116 and storage device 1118 can be similar to processing unit(s) 1104 and local storage 1106 described above. Suitable devices can be selected based on the demands to be placed on client computing system 1114; for example, client computing system 1114 can be implemented as a "thin" client with limited processing capability or as a high-powered computing device. Client computing system 1114 can be provisioned with program code executable by processing unit(s) 1116 to enable various interactions with server system 1100.

Network interface 1120 can provide a connection to the network 1126, such as a wide area network (e.g., the Internet) to which WAN interface 1110 of server system 1100 is also connected. In various embodiments, network interface 1120 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1122 can include any device (or devices) via which a user can provide signals to client computing system 1114; client computing system 1114 can interpret the signals as indicative of particular user requests or information. In various embodiments, user input device 1122 can include any or all of a keyboard, touch pad, touch screen, mouse or other pointing device, scroll wheel, click wheel, dial, button, switch, keypad, microphone, and so on.

User output device 1124 can include any device via which client computing system 1114 can provide information to a user. For example, user output device 1124 can include a display to display images generated by or delivered to client computing system 1114. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1124 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1104 and 1116 can provide various functionality for server system 1100 and client computing system 1114, including any of the functionality described herein as being performed by a server or client, or other functionality.

It will be appreciated that server system 1100 and client computing system 1114 are illustrative and that variations and modifications are possible. Computer systems used in connection with embodiments of the present disclosure can have other capabilities not specifically described here. Further, while server system 1100 and client computing system 1114 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method of training encoder-decoder models to cluster images, comprising:
   identifying, by a computing system having one or more processors, from a training dataset, a whole slide image (WSI) and an annotation, the WSI derived from a tissue section, the annotation identifying a region of interest in the WSI corresponding to one of a first plurality of subtypes of cancer in the tissue section;
   generating, by the computing system, a plurality of tiles from the region of interest of the WSI as identified in the annotation;
   applying, by the computing system, an image reconstruction model to the plurality of tiles, the image reconstruction model comprising:
      an encoder block having a first set of weights to generate a plurality of embedding representations corresponding to the plurality of tiles, at least one of the plurality of embedding representations corresponding to at least one subtype different from the first plurality of subtypes; and
      a decoder block having a second set of weights to generate a plurality of reconstructed tiles corresponding to the plurality of embedding representations;
   classifying, by the computing system, by applying a clustering model comprising a feature space to the plurality of embedding representations, each of the corresponding plurality of tiles into a respective one of a second plurality of subtypes of cancer at least partially different from the first plurality of subtypes of cancer;
   modifying, by the computing system, the feature space of the clustering model based on the classification determined for each of the plurality of tiles into the respective one of the second plurality of subtypes;
   determining, by the computing system, a first error metric between the plurality of tiles and the corresponding plurality of reconstructed tiles;
   determining, by the computing system, a second error metric based on classifying each of the plurality of tiles into the respective one of the second plurality of subtypes; and
   updating, by the computing system, at least one weight of (i) the first set of weights of the encoder block or (ii) the second set of weights of the decoder block in accordance with the first error metric and the second error metric.

2. The method of claim 1, further comprising:
   identifying, by the computing system, a plurality of centroids defined by the feature space of the clustering model prior to applying of the clustering model to the plurality of embedding representations, the plurality of centroids corresponding to the second plurality of subtypes; and
   identifying, by the computing system, a plurality of points defined within the feature space of the clustering model for the corresponding plurality of embedding representations, and
   wherein determining the second error metric further comprises determining the second error metric between the plurality of centroids and the plurality of points.

3. The method of claim 1, further comprising determining, by the computing system, a combined error metric in accordance with a weighted summation of the first error metric and the second error metric; and
   wherein updating the at least one weight further comprises updating the at least one of (i) the first set of weights of the encoder block or (ii) the second set of weights of the decoder block in accordance to the combined error metric.

4. The method of claim 1, further comprising:
determining, by the computing system, that the clustering model is not at a convergence state based on a comparison of a movement metric for a plurality of centroids in the feature space to a threshold value; and
reapplying, by the computing system, the image reconstruction model to the plurality of tiles responsive to determining that clustering model is not at the convergence state.

5. The method of claim 1, further comprising:
applying, by the computing system, subsequent to updating the at least one weight, the image reconstruction to the plurality of tiles, the encoder block to generate a second plurality of embedding representations corresponding to the plurality of tiles; and
applying, by the computing system, the clustering model to the second plurality of embedding representations to classify at least one of the plurality of tiles to a first subtype of the second plurality of subtypes different from a second subtype of the second plurality of subtypes as classified prior to the modifying of the feature space.

6. The method of claim 1, further comprising initializing, by the computing system, the clustering model comprising the feature space to define a plurality of centroids corresponding to the second plurality of subtypes, each of the plurality of centroids at least one of a random point or a predefined point within feature space.

7. The method of claim 1, wherein identifying the plurality of tiles further comprises identifying the plurality of tiles derived from the WSI of the training dataset, the WSI derived from the tissue sample via a histopathological image preparer, the sample image including the region of interest corresponding to one of the first plurality of subtypes present in the tissue sample.

8. A method of clustering images using encoder-decoder models, comprising:
identifying, by a computing system having one or more processors, a first whole slide image (WSI) acquired via an image acquisition device, the first WSI derived from a first tissue section;
generating, by the computing system, a plurality of tiles from a portion of the first WSI corresponding to the first tissue section;
applying, by the computing system, an image reconstruction model to the plurality of tiles, the image reconstruction model comprising:
an encoder block having a first set of weights to generate a plurality of embedding representations corresponding to the plurality of tiles, at least one of the plurality of embedding representations corresponding to at least one subtype different from a first plurality of subtypes; and
a decoder block having a second set of weights to generate a plurality of reconstructed tiles corresponding to the plurality of embedding representations,
the first set of weights of the encoder block and the second set of weights of the decoder block trained using a second WSI and an annotation from a training dataset, the second WSI derived from a second tissue section, the annotation identifying a region of interest in the WSI corresponding to a respective one of the first plurality of subtypes of cancer in the second tissue section; and
classifying, by the computing system, by applying a clustering model comprising a feature space to the plurality of embedding representations, each of the corresponding plurality of tiles into a respective one of a second plurality of subtypes of cancer in the first tissue section, the second plurality of subtypes of cancer at least partially different from the first plurality of subtypes of cancer; and
providing, by the computing system, an output identifying the classification for each of the plurality of tiles from the first WSI to the respective one of the second plurality of subtypes.

9. The method of claim 8, wherein applying the clustering model further comprises the applying clustering model comprising the feature space, the feature space defining a plurality of centroids corresponding to the second plurality of subtypes to classify each of the corresponding plurality of tiles to one of the second plurality of subtypes.

10. The method of claim 8, wherein identifying the plurality of tiles further comprises identifying the plurality of tiles derived from the WSI, the WSI derived from a tissue sample via a histopathological image preparer, the WSI including a region of interest corresponding to one of the plurality of subtypes present in the tissue sample.

11. The method of claim 8, further comprising training, by the computing system, the image reconstruction model to modify at least one weight of (i) the first set of weights of the encoder block or (ii) the second set of weights of the decoder block in accordance with an error metric determined using the clustering algorithm.

12. A system for training encoder-decoder models to cluster images, comprising:
a computing system having one or more processors coupled with memory, configured to:
identify, from a training dataset, a whole slide image (WSI) and an annotation, the WSI derived from a tissue section, the annotation identifying a region of interest in the WSI corresponding to one of a first plurality of subtypes of cancer in the tissue section;
generate a plurality of tiles from the region of interest of the WSI as identified in the annotation;
apply an image reconstruction model to the plurality of tiles, the image reconstruction model comprising:
an encoder block having a first set of weights to generate a plurality of embedding representations corresponding to the plurality of tiles, at least one of the plurality of embedding representations corresponding to at least one subtype different from the first plurality of subtypes; and
a decoder block having a second set of weights to generate a plurality of reconstructed tiles corresponding to the plurality of embedding representations;
classify by applying a clustering model comprising a feature space to the plurality of embedding representations, each the corresponding plurality of tiles into a respective one of a second plurality of subtypes of cancer at least partially different from the first plurality of subtypes of cancer;
modify the feature space of the clustering model based on classifying of the plurality of embedding representations into one of the second plurality of subtypes;
determine a first error metric between the plurality of tiles and the corresponding plurality of reconstructed tiles;
determine a second error metric based on classifying each of the plurality of tiles into the respective one of the second plurality of subtypes; and update at least one weight of (i) the first set of weights of the encoder block or (ii) the second set of weights of the decoder block in accordance with the first error metric and the second error metric.

13. The system of claim 12, wherein the computing system is further configured to:
  identify a plurality of centroids defined by the feature space of the clustering model prior to applying of the clustering model to the plurality of embedding representations, the plurality of centroids corresponding to the second plurality of subtypes; and
  identify a plurality of points defined within the feature space of the clustering model for the corresponding plurality of embedding representations, and
  determine the second error metric between the plurality of centroids and the plurality of points.

14. The system of claim 12, wherein the computing system is further configured to:
  determine a combined error metric in accordance with a weighted summation of the first error metric and the second error metric; and
  update the at least one of (i) the first set of weights of the encoder block or (ii) the second set of weights of the decoder block in accordance to the combined error metric.

15. The system of claim 12, wherein the computing system is further configured to:
  determine that the clustering model is not at a convergence state based on a comparison of a movement metric for a plurality of centroids in the feature space to a threshold value; and
  reapply the image reconstruction model to the plurality of tiles responsive to determining that clustering model is not at the convergence state.

16. The system of claim 12, wherein the computing system is further configured to:
  apply, subsequent to updating the at least one weight, the image reconstruction to the plurality of tiles, the encoder block to generate a second plurality of embedding representations corresponding to the plurality of tiles; and
  apply the clustering model to the second plurality of embedding representations to classify at least one of the plurality of tiles to a first subtype of the second plurality of subtypes different from a second subtype of the second plurality of subtypes as classified prior to the modifying of the feature space.

17. The system of claim 12, wherein the computing system is further configured to identify the plurality of tiles derived from the WSI of the training dataset, the WSI derived from the tissue sample via a histopathological image preparer, the WSI including the region of interest corresponding to one of the first plurality of subtypes present in the tissue sample.

* * * * *